United States Patent [19]
Thayer et al.

[11] Patent Number: 5,909,572
[45] Date of Patent: Jun. 1, 1999

[54] SYSTEM AND METHOD FOR CONDITIONALLY MOVING AN OPERAND FROM A SOURCE REGISTER TO A DESTINATION REGISTER

[75] Inventors: John S. Thayer, Houston, Tex.; John G. Favor, Scotts Valley; Frederick D. Weber, San Jose, both of Calif.

[73] Assignees: Compaq Computer Corp., Houston, Tex.; Advanced Micro Device, Inc., Sunnyvale, Calif.

[21] Appl. No.: 08/759,025

[22] Filed: Dec. 2, 1996

[51] Int. Cl.$^6$ .................................................. G06F 9/00
[52] U.S. Cl. ........................... 395/567; 395/564; 395/566
[58] Field of Search .................... 395/567, 564, 395/566, 562, 568, 563, 595, 800.35

[56] References Cited

U.S. PATENT DOCUMENTS

| | | | |
|---|---|---|---|
| 3,701,977 | 10/1972 | Mendelson et al. | 711/126 |
| 4,707,800 | 11/1987 | Montrone et al. | 364/788 |
| 4,725,973 | 2/1988 | Matsuura et al. | 364/736.03 |
| 4,782,441 | 11/1988 | Inagami et al. | 395/800.09 |
| 4,849,882 | 7/1989 | Aoyama et al. | 395/800.06 |
| 4,884,197 | 11/1989 | Sachs et al. | 711/123 |
| 4,891,754 | 1/1990 | Boreland | 395/586 |
| 5,025,407 | 6/1991 | Gulley et al. | 364/748.2 |
| 5,073,864 | 12/1991 | Methvin et al. | 364/715.11 |
| 5,181,183 | 1/1993 | Miyazaki | 364/725.03 |
| 5,187,796 | 2/1993 | Wang et al. | 395/800.04 |
| 5,193,167 | 3/1993 | Sites et al. | 711/163 |
| 5,226,171 | 7/1993 | Hall et al. | 395/800.09 |
| 5,235,536 | 8/1993 | Matsubishi et al. | 364/736.04 |
| 5,251,323 | 10/1993 | Isobe | 395/800.05 |
| 5,307,300 | 4/1994 | Komoto et al. | 364/736.01 |
| 5,335,330 | 8/1994 | Inoue | 395/588 |
| 5,434,592 | 7/1995 | Dinwiddie, Jr. et al. | 345/133 |
| 5,437,043 | 7/1995 | Fujii et al. | 395/800.1 |
| 5,453,945 | 9/1995 | Tucker | 364/725.01 |
| 5,471,637 | 11/1995 | Pawlowski et al. | 394/296 |
| 5,511,219 | 4/1996 | Shimony et al. | 395/800.35 |
| 5,513,366 | 4/1996 | Agrawal et al. | 395/800.22 |

(List continued on next page.)

OTHER PUBLICATIONS

A comparison of full and partial predicated execution support for ILP processors by Mahlke et al., 1995 IEEE publication, pp. 138–149.

Kohn, L, et al., "The Visual Instruction Set (VIS) in UltraSPARC," SPARC Technology Business—Sun Microsystems, Inc., 1996 IEEE pp. 462–489.

Gwennap, Linley, "UlatraSparc Adds Multimedia Instructions—Other New Instructions Handle Unaligned and Little–Endian Data," Microprocessor Report, Dec. 5, 1994, pp. 16–18.

Lee, Ruby B., "Realtime PMEG Video via Software Decompression on a PA–RISC Processor," Hewlett–Packard Company, 1995 IEEE, pp. 186–192.

Mattison, Phillip E., "Practical Digital Video With Programming Examples in C, " Wiley Professional Computing, pp. 158–178.

Zhou, Chang–Guo, et al., "MPEG Video Decoding With the UltraSPARC Visual Instruction Set," Sun Microsystems Inc., 1995 IEEE, pp. 470–474.

*Primary Examiner*—Zarni Maung
*Attorney, Agent, or Firm*—Conley, Rose & Tayon; Robert C. Kowert; Kevin L. Daffer

[57] ABSTRACT

A multimedia extension unit (MEU) is provided for performing various multimedia-type operations. The MEU can be coupled either through a coprocessor bus or a local CPU bus to a conventional processor. The MEU employs vector registers, a vector ALU, and an operand routing unit (ORU) to perform a maximum number of the multimedia operations within as few instruction cycles as possible. Complex algorithms are readily performed by arranging operands upon the vector ALU in accordance with the desired algorithm flowgraph. The ORU aligns the operands within partitioned slots or sub-slots of the vector registers using vector instructions unique to the MEU. At the output of the ORU, operand pairs from vector source or destination registers can be easily routed and combined at the vector ALU. The vector instructions employ special load/store instructions in combination with numerous operational instructions to carry out concurrent multimedia operations on the aligned operands.

12 Claims, 11 Drawing Sheets

U.S. PATENT DOCUMENTS

| | | | |
|---|---|---|---|
| 5,537,640 | 7/1996 | Pawlowski et al. | 711/146 |
| 5,627,981 | 5/1997 | Adler et al. | 395/582 |
| 5,640,588 | 6/1997 | Vegesna et al. | 395/800.23 |
| 5,644,520 | 7/1997 | Pan et al. | 364/736.01 |
| 5,655,096 | 8/1997 | Branigin | 395/376 |
| 5,669,013 | 9/1997 | Watanabe et al. | 395/825 |
| 5,673,408 | 9/1997 | Shebanow et al. | 395/392 |
| 5,673,426 | 9/1997 | Shen et al. | 395/591 |
| 5,692,211 | 11/1997 | Gulick et al. | 395/800.35 |
| 5,745,721 | 4/1998 | Beard et al. | 395/384 |
| 5,801,975 | 9/1998 | Thayer et al. | 364/725 |
| 5,850,227 | 12/1998 | Longhenry et al. | 345/439 |

SYSTEM AND METHOD FOR CONDITIONALLY MOVING AN OPERAND FROM A SOURCE REGISTER TO A DESTINATION REGISTER

BACKGROUND OF THE INVENTION

1. Field of the Invention

This invention relates to digital signal processing (DSP), and more particularly to an extension unit added to a microprocessor for high speed multimedia applications. The extension unit includes an operand routing unit which aligns multiple operands upon an arithmetic logic unit (ALU) in response to specific multimedia-type instructions. Proper ordered arrangement of operands at the ALU enhances the throughput of many image compression algorithms which rely upon repetitive, sequential operations.

2. Description of the Relevant Art

It is well known that conventional computers communicate information primarily through a graphical user interface (GUI). The GUI involves manipulation of complex graphical images, as either still graphic images or full motion video. Current software has spawned numerous multimedia applications which require administering still images or video via the GUI.

Processing still images or video consumes prodigious amounts of storage space within the computer. For example, a 256 color VGA screen image can entail numerous rows and pixels, each consuming a single byte of store. For example, a partial screen containing 200 rows of 320 pixels consumes a minimum of 64 K bytes of storage. Real time processing of still images (and especially video) thereby requires that the amount of data be reduced. The task of reducing the amount of data necessary to store or transmit one or more digital images is often referred to as "image compression".

Image compression can be classified as either lossy or lossless. If the reconstructed image is not identical to the original image, the compression is said to be lossy. Lossy compression is used where the reconstructed image, while not identical to the original image, nonetheless conveys the essential features of the image. Minor changes may not be perceptible to a human observer, or may not be objectionable for a particular application. Lossy compression can therefore reduce the amount of data relative to lossless compression but without perceptible defects.

FIG. 1 illustrates a conventional lossy image compression system 10. System 10 is shown applicable to image (i.e., still image or full motion image) compression and decompression. An original image is compressed by an image encoder 12, and the encoded output may be further processed in block 14 using, for example, error correction, encryption, multiplexing, etc. The compressed image can be stored or sent through a communications channel. If forwarded through a communications channel, the compressed data is modulated upon a carrier signal by modulator 16. The data-modulated carrier signal is then forwarded to a decoder via channel 18. If the data is transmitted and requires demodulation, block 20 is used to extract the compressed image which can then be further processed as needed by block 22. Block 22 is used to perform, for example, decryption, demultiplexing, etc. Decoder 24 receives the compressed image having redundant or irrelevant data removed, and thereafter produces a reconstructed image perceptibly similar to the original image.

FIG. 2 illustrates, in further detail, an image encoder 12 used for compressing an image as either a still image or a sequence of images (i.e., full motion video). Upon receiving the image in either RGB or YCrCb format, encoder 12 encodes certain "frames" of a plurality of frames within the sequence of motion images or still images. Frames within a video sequence can be compressed using numerous compression standards, a popular one being the Moving Pictures Experts Group (MPEG) standard. MPEG compression involves discerning intracoded frames from non-intracoded frames. An intracoded frame, often called I-frame, is compressed relative to itself, while a non-intracoded frame, often called P-frames and B-frames, are encoded by exploiting temporal redundancy as well as spatial redundancy to reduce the number of bits required for encoding.

Encoding and decoding video presents many challenges to realizing an efficient MPEG compression standard. The intracoded frames are stored, generally in a moderately compressed format. Successive non-intracoded frames are compared with the intracoded frames and the differences are stored. Periodically, such as when a new scene is displayed, a new intracoded frame is stored, and subsequent comparisons begin from this new reference point.

Video compression standards such as MPEG, DVI and Indeo, all use the-intracoded frame technique. Many compression standards such as MPEG treat various frames within the frame sequence as a still image and apply still image compression to those frames. A popular still image compression standard is Joint Photographic Experts Group (JPEG). Encoder 12 illustrates numerous blocks used in MPEG video compression, of which a portion of those blocks are pertinent to, e.g., JPEG. The JPEG portion of encoder 12 is shown within dashed area 26. Functional blocks within dashed area 26 serve to compress pixel data within blocks of each macro block arising from the original frame or image. The compressed digital data is then forwarded into an embedded decoder 30. Embedded decoder 30 is used in a feedback arrangement, wherein the output of decoder 30 is subtracted from the original frame. Subtraction is shown at block 32, and the output from functional blocks 26 is shown fed into a buffer 34 for subsequent output as compressed intracoded and non-intracoded frames.

In order to avoid having to store or transmit large amounts of information on each pixel within each frame, MPEG reduces the data to that which is pertinent only to intracoded and non-intracoded frames. As seen in the feedback arrangement of FIG. 2, data manipulation must be performed as rapidly as possible on each macro block or frame, preferably in real time. Substantial data reduction (lossy compression) is needed on frames of interest and generally occurs in JPEG blocks 26 and, more specifically, during quantization.

JPEG generally employs three stages of compression. A first stage utilizes a discrete cosine transform (DCT) function 36. DCT is a class of mathematical operations which take a signal and transform it from one type of representation to another. Specifically, DCT converts an array of numbers, which represent signal amplitudes at various points in time and space, into another array of numbers, each of which represent the amplitude of a certain frequency component from the original signal. The resulting array of numbers contains the same number of values as the original array. Using a JPEG format, DCT transform is performed on a block of 8×8 picture elements (or "pels") taken from an original image.

Output from DCT 36 is fed to a quantizer 38. Quantization 38 involves the lossy stage of data compression by reducing the number of bits needed to store an integer value of lessened precision. A quantization matrix, chosen by a code word, reduces the matrix values output from DCT to the indices for the code words. Upon decode, the images are reconstructed using a table look-up procedure, given the code word selected by the quantization algorithm. The International Standards Organization (ISO) maintain the quantatization code words used by implementers of JPEG code. The quantization matrix can be coded in block 40 using several methods. For example, the quantized images of each frame can be arranged in a zig-zag sequence. The zig-zag sequence is then coded using run-length encoding (RLE) followed by entropy coding (which includes the popular Huffman code).

Code output from block 40 is a variable length code which generally represents smaller decimal numbers, and can be represented with corresponding smaller number of bits depending upon the decimal value. An advantage of using smaller number variable length coding is carried forth within the intracoded and non-intracoded sequence of frames, or more particularly within each macro block of a frame. Accordingly, MPEG involves JPEG-type compression on each selected frame macro block, coupled with frame-by-frame compression using motion estimation, motion compensation and frame classification. Motion estimation, motion compensation and frame classification is relevant on only decoded pertinent frames which are produced as part of the feedback loop within inverse quantization 42 and inverse DCT 44. After undergoing inverse quantization and inverse DCT, the resulting frames are stored in reference memory 46 where they can thereafter be drawn together and placed within motion estimation block 48. Motion estimation block 48, in combination with intracoded and non-intracoded (i.e., intra/inter) frame classifier block 50, form the motion estimation/compensation portion of MPEG. Motion compensation is defined as a process of compensating for displacement of moving objects from one frame to another, and motion estimation is the process of estimating location of corresponding pels with the frames. For each block in the current P-frame, the block in the referenced frame (i.e., I-frame) which matches it best is identified by a motion vector. The differences, undertaken by subtraction block 32, between the pixel values in the matching block in the reference frame and the current block in the current frame is then transformed, quantized and coded by blocks 26.

Blocks 26 used for JPEG functionality, and the various blocks 42–50 used for MPEG decoding, feedback, motion estimation/compensation, and frame classification are generally well documented in the field of image compression. References to many of the blocks shown in FIG. 2 are set forth in numerous disclosures, an exemplary disclosure being Bhaskaran, et al. "Image Compression Standards and Architectures", *ACM Multimedia* 94, October, 1994, (herein incorporated by reference).

Transformation of a picture element to a DCT output, as well as quantization and coding of that output, requires algorithms unique to multimedia applications. Performing decoding (inverse quantization and inverse DCT) as well as motion estimation and compensation also require operation-intensive algorithms. Those operations can generally be classified as add, multiply, subtract, shift and accumulate operations, each of which must be performed as quickly as possible in order to make JPEG and MPEG a viable compression standard. Dedicated digital signal processors (DSPs) are generally used to carry out those operations in an expeditious manner. DSPs are often included within multimedia devices such as sound cards, speech recognition cards, video capture cards, etc. DSPs function as coprocessors, performing complex and repetitive mathematical computations demanded by the data compression algorithms. DSPs perform specific multimedia-type algorithms more efficiently than general purpose microprocessors.

There are numerous types of DSPs which can perform JPEG and MPEG data compression. For example, Hewlett Packard Corp. PA-7100LC microprocessor functions not only as a general purpose processor, but also as a DSP with generic multimedia-type instructions added to increase data compression throughput. Compression throughput of the PA-7100LC is primarily limited by the execution time involved in performing DCT or inverse DCT (IDCT). See, e.g., Lee, "Realtime MPEG Video via Software Decompression on a PA-RISC Processor", IEEE, 1995, pp. 186–192 (herein incorporated by reference). Sun Microsystems, Inc. has also devised a multimedia-type instruction set labeled Visual Instruction Set (VIS) which is designed to run on the UltraSPARC™ processor. See, e.g., Kohn, et al., "The Visual Instruction Set (VIS) in UltraSPARC™" *IEEE,* 1995, pp. 462–469 (herein incorporated by reference); and, Chang-Guo Zhou, "MPEG Video Decoding With The Ultrasparc™ Visual Instruction Set", *IEEE,* 1995, pp. 470–474 (herein incorporated by reference). Similar to the dedicated multimedia instruction set used by the PA-7100LC, maximum efficiency of a VIS is limited to a particular multimedia application. For example, the optimized instruction set may be efficient in performing fast fourier transforms (FFT), motion estimation or Huffman encoding, but may be lacking in other areas, such as the critical operation-intensive IDCT area. Further, while current multimedia instructions offer a fixed performance increase as to existing algorithms, they unfortunately do not always provide scalability to different types of algorithms or specific algorithms which change over time. As the new standards for JPEG, MPEG, DVI, Indeo and H.320 arrive, new algorithms may be needed where scalability to those operations is critical in achieving viable, real-time compression.

DCT and IDCT form a substantial part of an encode and/or decode algorithm, and certainly contribute numerous operations to data compression. As shown in FIG. 2, DCT and IDCT comprise prevalent portions of an encoder. For an 8×8 block of pixel elements, the DCT transform is generally represented as follows:

$$DCT(i,j) = 1/(\sqrt{2*8})C(i)C(j)\sum_{x=0}^{7}\sum_{y=0}^{7}\text{pixel}(x,y) \quad \text{(Eq. 1)}$$

$$\cos[(2x+1)i\pi/(2*8)]\cos[(2y+1)j\pi/(2*8)]$$

$$C(x) = 1/\sqrt{2} \text{ if } x \text{ is 0, else 1 if } x > 0$$

Equation 1 indicates numerous multiply, add (or subtract), shift, and accumulate operations needed to carry out DCT. According to the article by Bhaskaran, several thousand multiply and add operations are necessary to perform the operations in equation 1. While faster algorithms reduce the operation count, the number of operations still remains daunting when performed on conventional DSPs. Even DSPs which have specialized multiply, add/subtract and accumulate multimedia-type instruction sets still require numerous instruction cycles in order to complete DCT on a matrix of numbers.

IDCT is carried out not only in an embedded decoder 30 of encoder 12 (shown in FIG. 2), but also in the decoder 24 shown in FIG. 3 at the receiving end of a storage unit or channel. Decoder 24 is shown for illustrative purposes as an MPEG decoder, comprising functional blocks 56–66 which essentially reverse the steps taken by an MPEG compression encoder. Decoder 24 decodes the MPEG header, which provides information regarding the block, macro block, and frame or sequence of frames which follow the header. The variable length encoded pels which follow the header are decoded into fixed length numbers by variable length decoding block 56. A reverse order scan of blocks and macro blocks across the frame, and from frame-to-frame, is performed at block 58. Next, inverse quantatization 60 is applied to the inverse scanned numbers to restore them to the original range. Then, an IDCT computation 62 is performed on the blocks in each frame. IDCT converts the frequency domain back to the original spatial domain, and provides the actual pixel values for I-blocks, but only the differences for each pixel for P-blocks and B-blocks. Next, motion compensation is performed for P-blocks and B-blocks. The differences calculated in the IDCT computation are added to the pixels in the reference block as determined by the motion vector, for P-blocks, and to the average of the forward and backward reference blocks, for B-blocks. Motion compensation is shown by reference numeral 64. Memory 66 is periodically updated at each frame within a plurality of frames which represent a reconstructed image.

Regardless of the data compression standard used, encode and decode operations employ lengthy computations, and a substantial number of those computations involve DCT or IDCT operations. Similar to DCT transform, IDCT requires a careful selection of operations sequentially applied as multiply, add, subtract, shift and accumulate operations. An IDCT transform function for an 8×8 matrix can be shown as follows:

$$\text{Pixel}(x, y) = 1/(\sqrt{2*8}) \sum_{i=0}^{7} \sum_{j=0}^{7} C(i)C(j)DCT(i,j) \quad \text{(Eq. 2)}$$

$$\cos[(2x+1)\pi/(2*8)]\cos[(2y+1)j\pi/(2*8)]$$

$$C(x) = 1/\sqrt{2} \text{ if } x \text{ is 0, else 1 if } x > 0$$

There is no theoretical or mathematical limit on the size of the input array for an IDCT computation. Equation 2 would be the same for transforming an entire image, although the computation time required for that large an array would be prohibitive. As set forth in Mattison, *Practical Digital Video With Programming Examples In C* (John Wiley & Sons, 1994) pp. 158–178 (herein incorporated by reference), the number of multiplication operations required for each element of a one dimensional DCT matrix is proportional to the square of the number of elements in the sample array. Accordingly, reducing the array size from a two-dimensional array to a one-dimensional array (e.g., to a 1×8 array) serves to reduce the number of overall computations for each array. The following equation illustrates an IDCT transform function for converting a 1×8 matrix of elements to a 1×8 column of pixels:

$$\text{Pixel}(m) = \sqrt{2}/8 \sum_{j=0}^{7} DCT(j)C(j)\cos[(2m+1)j\pi(2*8)] \quad \text{(Eq. 3)}$$

$$C(j) = 1/\sqrt{2} \text{ when } j = 0, \text{ else 1 if } j > 0$$

Dividing the original image into one-dimensional smaller blocks helps reduce the number of computations on each array from over several thousand to a more manageable number, e.g., 16 multiplications and 26 additions (or subtractions/accumulations). See, e.g., Bhaskaran, "Image Compression Standards and Architectures", pp. 10–12.

It is desirable to introduce a DSP which can optimally perform multimedia-type operations in a rapid manner, at or near real time. The multimedia operations would benefit from being executed upon a DSP formed as part of an existing processor, similar to conventional designs but without the scalability limitation. Thus, the desired DSP must be capable of performing current or future-derived mathmatical computations using not only an enhanced multimedia-type instruction set but also using enhancements to existing hardware. An improved DSP is thereby needed which functions as a hardware and software extension to an existing processor core. Responsive to multimedia instructions, a DSP is needed which allows routing of operands to an arithmetic logic unit (ALU) in accordance with present or future-desired algorithms. An improved DSP is needed which can route multiple operands (i.e., more than two operands) simultaneously from partitioned, non-integer registers to the ALU depending upon any algorithm which might be chosen. The improved DSP must be capable of functioning on algorithms unique to JPEG, MPEG, DVI, Indeo, H.320 and, more specifically, on any future algorithm which requires multiple operations carried out in a structured sequence of simultaneous operations. A popular algorithm to which such a DSP would be particularly useful is one involving IDCT.

Enhancements to existing processors or to existing instruction sets are thereby needed to make MPEG, JPEG, H.320, etc., more viable as data compression standards. It would be desirable to perform as many operation-intensive computations as possible in parallel, and within as few instruction cycles as possible. It would also be beneficial to reorder operands such that operands exist in optimal order for such processing. Each operand within a set of operands must be chosen from one of numerous locations within a non-integer register. Reading from and writing to non-integer registers would avoid bandwidth limitations on existing integer registers, while allowing access to integer register simultaneous with the multimedia-dedicated (non-integer) registers.

SUMMARY OF THE INVENTION

The problems outlined above are in large part solved by a multimedia extension unit (MEU) of the present invention. The MEU hereof embodies hardware components, and software instructions which optimally operate those components. The MEU is added to an existing processor to more efficiently perform multimedia-type operations. Thus, the MEU functions as a DSP, but more specifically as a high performance DSP necessary for achieving real time data compression. The MEU can perform multiple operations within a single instruction cycle and therefore is particularly useful in performing repetitive, sequential operations found in MPEG, JPEG, DVI, Indeo and H.320 compression systems.

The ability to perform multiple operations is contingent upon aligning numerous operands at select moments upon particular partitions within a partitioned arithmetic logic unit (ALU). Thus, the MEU embodies hardware components which can arrange operands in response to specific operand routing instructions. To carry out operand routing, the MEU employs, inter alia, three components: a partitioned ALU, an operand routing unit (ORU), and a series of partitioned registers. The ALU is partitioned into vectors, each of which can perform a separate and independent operation from the other vectors. The ORU aligns a series of operands on respective partitions of the vector ALU so that an operation can be performed on each operand concurrent with operations on other operands. The operands are provided from registers. Each register is partitioned into a series of vectors, classified as either slots or sub-slots. Each slot or sub-slot contains sufficient bit locations to store an operand.

Operand routing is responsive to numerous multimedia-type instructions unique to the MEU. The multimedia-type instructions, or "vector instructions", are decoded to the ORU as well as to each vector of the ALU. Those instructions not only ensure that multiple operands are properly aligned to respective partitions of the ALU, but also serve to perform various data compression algorithms in a more efficient manner. For example, a dedicated accumulate/ merge instruction proves useful during the latter stages of an algorithm when intermediate results are being merged into a final result. An accumulate/merge instruction allows a final operation (i.e., add, subtract, multiply, etc.) to occur on an intermediate result concurrent with a merging into the final result. Without an accumulate/merge instruction, repetitive move instructions are needed which cannot be performed in parallel with other useful instructions. As another example, a source partition shift instruction is used to quickly move data within one slot of a source register to an incremental next slot within a destination register. A single source partitioned shift instruction can thereby move data between slots while simultaneously moving in new slot information. Moving data between slots proves useful in performing serial operations such as those found in FIR filters. As yet another example, logic shift and arithmetic scaling instructions are used to readily perform pixel format conversions. By having the capability of shifting up to four bits in either direction, the shifting operation can easily convert between pixel color formats, such as unpacking from low-color texture information in memory to higher-color display pixels. For example, 8-bit values can be readily unpacked to 16-bit data during a load operation, followed by multiple shifting of that loaded data exclusively within the MEU.

Vector instructions allow loading of either an 8-bit byte or a 16-bit word into a 10-bit register sub-slot or a 20-bit register slot. Accordingly, the MEU supports either 8/10 bit or 16/20 bit data types. Loading the slots/sub-slots from a memory location expands the data width by 25 percent. Expanding the data width increases the precision of the DSP operations. Adding two or four bits to a value increases the number of digits to the right of a fixed point number resulting from, for example, an addition, subtraction or multiplication operation. The added precision proves valuable especially when performing an accumulation operation. A store instruction is opposite a load instruction, and performs truncation on two or four of the least significant bits. Truncation is generally not a problem since most intermediate results are stored within the expanded bit locations of the registers. Generally, it is only after the operations are completed, and not during the interim, that the result is stored in truncated form.

The present MEU can use pre-existing registers of an x86 floating point unit (FPU). Instead of storing floating point values, the vector instructions treat the registers as containing fixed-point data values. The registers are partitioned into slots and sub-slots, and are thereby referred to as vector registers containing data values involved with DSP calculations. The vector registers can be accessed concurrently with the x86 CPU registers (generally referred to as "integer registers"). An MEU operation does not involve continual scheduling by the core CPU and, accordingly, the vector registers can operate concurrent with the integer registers handling addressing calculations and program flow control.

Depending upon the complexity of the ORU, and the number of partitions within the vector registers and ALU, the MEU can achieve a varying degree of performance which is scaleable to any intended DSP application without constraining the CPU or the CPU bandwidth. The scaleable architecture to either 8/10 or 16/20 bit data types helps prevent limitations to current data compression algorithms and provides for future applications, such as revisions or upgrades to the MPEG and JPEG standards. While ORU and instruction decoding operates on slot boundaries, overall flexibility is gained by serving operands which are sized to either a slot or a sub-slot. Thus, depending upon the performance desired, either 10-bit or 20-bit operands can be aligned and therefore either m or 2m operations can be performed in a single instruction cycle. For example, in motion estimation or during logic shifting, numerous 10-bit rather than fewer 20-bit values may be needed. This is certainly the case when numerous, low-precision operations must be carried out in rapid succession.

The more scaleable or flexible MEU architecture is therefore attuned to almost any desired algorithm. According to one embodiment, the MEU can accommodate up to sixteen operands within a single instruction cycle. Given reasonable die constraints, the MEU can align those operands for discrete, concurrent operations. For example, the MEU can perform all IDCT transform operations on a 1×8 set of values within only six instruction cycles.

Broadly speaking, the present invention contemplates a system for routing operands to an ALU. The ALU is partitioned, and the system comprises a first register and a second register, denoted as vector registers. The vector registers are contained in the MEU and are partitioned into a plurality of slots and sub-slots. As part of the operand routing hardware, a multiplexer is coupled to convey to the ALU an operand within any of the plurality slots of the second register. Thus, operands within the second register are reordered in accordance with operands within the first register. Operands within the second register and first register are appropriately paired and simultaneously conveyed to separate partitions within the ALU.

The present invention further contemplates a computer. The computer comprises an input/output device operably coupled to a microprocessor. The microprocessor includes an instruction cache adapted for storing coded first and second sets of instructions. The first set of instructions comprises integer instructions, and a second set of instructions comprises non-integer instructions, or vector instructions. A decode unit is used for decoding and routing the vector instructions to a plurality of vector registers, an operand routing unit (ORU) and a vector ALU. The vector registers are useable for storing floating point numbers, but adapted for storing fixed point values. The fixed point values are periodically drawn upon by the ORU and the ALU. The ORU is responsive to a vector instruction for rearranging operands forwarded from a second register. The operands are arranged so that each operand from the second register is paired with an operand from the first register. The pairing is chosen for achieving as many concurrent operations as possible. During each instruction cycle, an operation can be performed for each pair of sub-slots or for each pair of slots, depending upon the amount of scalability desired.

The present invention further contemplates an MEU capable of executing two distinct sets of operations within a single instruction cycle. The MEU includes first and second vector registers and a vector ALU. The vector ALU is partitioned into a first logic portion and a second logic portion, wherein the first logic portion is operably coupled to receive a first operand within one of the slots of the first register and a second operand within one of the slots of the second register. The second logic portion is operably coupled to receive a third operand within one of the slots of the first register and a fourth operand within one of the slots of the second register. The first and second logic portions performs arithmetic operations concurrently, however, the arithmetic operation performed by the first logic portion may be dissimilar from the operation performed by the second logic portion. For example, an operation can be performed on operands in each slot, and if eight slots are present, then four add operations can be performed simultaneously with four subtract operations. Thus, the first logic portion can perform an add upon the first and second operands while the second logic portion can perform a subtract on the third and fourth operands. Of course, there are more than four operands which can be forwarded to the ALU and, specifically, there are s operands sent from one source register while another s operands are sent from another source register (or from a destination register). Accordingly, operands forwarded to the ALU can arise from either source registers or from a destination register, the destination register being a register for storing immediate results of operations upon the source registers.

The present invention yet further contemplates instructions which can load or store data to vector registers or memory locations, respectively. The system comprises a first memory element partitioned into a plurality of n bit slots, each slot of which is further partitioned into a pair of n/2 bit sub-slots. According to one embodiment, the first memory element is a vector register. The system further comprises a second memory element partitioned into a plurality of n/2 bit memory locations. According to one embodiment, the second memory element is a semiconductor memory. A data bus is connected between the first and second memory elements for transferring a plurality of operands between the plurality of slots (or sub-slots,) and memory locations. According to one embodiment, the data bus can be connected to load operands in successive memory locations to successive pair of sub-slots. According to another embodiment, the data bus can load zero values to a first set of slots within a plurality of slots while loading operands into a plurality of slots subsequent to the first set of slots. According to yet another embodiment, the data bus can load operands in a successive pair of the memory locations to a pair of sub-slots arranged in successive but dissimilar slots. According to yet another embodiment, the data bus can load every other successive memory location of the plurality of memory locations to sub-slots within the successive plurality of slots; the other sub-slots of the plurality of slots are loaded with immediate zero values. Converse to the loading operation, the data bus can also perform the above embodiments for various store instructions.

The present invention still further contemplates a vector instruction for swapping operands between sub-slots within one or more slots. More specifically, the swapping instruction can be used to exchange operands within sub-slots of one source register (or a pair of source registers) to sub-slots of a destination register. Thus, 10 bits of a 20 bit operand can be routed across an upper/lower sub-slot boundary to rearrange the upper and lower half bit locations. For example, upper and lower halves of a 20-bit operand within a slot of one register can be exchanged and placed in a slot of a destination register. Further, upper and lower halves of a slot within respective dissimilar source registers can be concatenated in various swapping arrangements to a slot within a destination register, all of which would be beneficial in routing smaller bit operands or routing larger bit operands across the mid-slot barrier. Thus, the ORU routes slots, while software instructions can route sub-slots within each slot.

The present invention yet further contemplates vector instructions such as conditional move and accumulate instructions. A conditional move instruction is particularly useful when mapping data from a source register to a destination register depending upon the value of another source register. Conditional moves are often employed when moving a pixel value represented as an operand from one location within an image to another depending upon the condition of another pixel within that frame or another frame. Conditional moves are needed when performing, for example, motion estimation and compensation. In addition to conditional moves, accumulate operations are also beneficial. For example, accumulate is needed when performing any type of running accumulation of arithmetic values. Vector instructions, such as conditional move and accumulate, enhance DSP throughput but, more specifically, do so while avoiding unnecessary operations.

Arithmetic scaling which is lacking from many conventional operations is readily performed as part of the present load/store instructions. For example, packing and unpacking instructions found in many DSP instruction sets can be avoided. Thus, unpacking of an 8-bit word into a 20-bit slot occurs as part of a load instruction, whereas packing of a 20-bit operand to an 8-bit word occurs as part of the store instruction. Combining packing and unpacking operations into store and load helps eliminate unnecessary move operations which occur as part of stand-alone conventional pack and unpack instructions.

BRIEF DESCRIPTION OF THE DRAWINGS

Other objects and advantages of the invention will become apparent upon reading the following detailed description and upon reference to the accompanying drawings in which.

Figure 1:
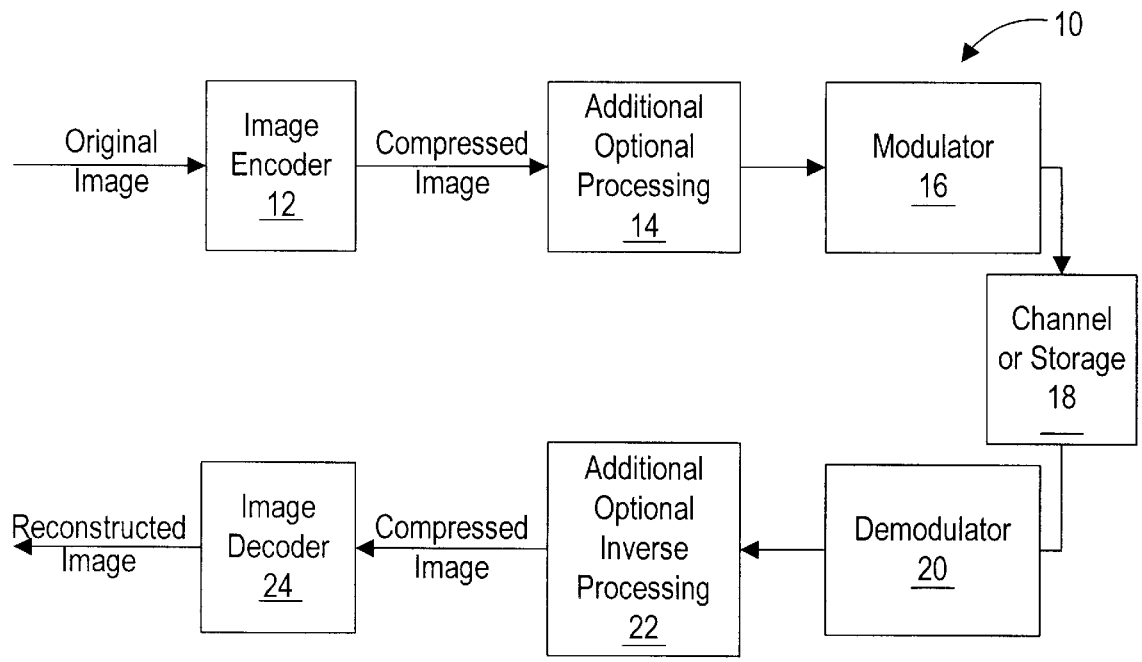
FIG. 1 is a block diagram of an image compression system.
Figure 2:
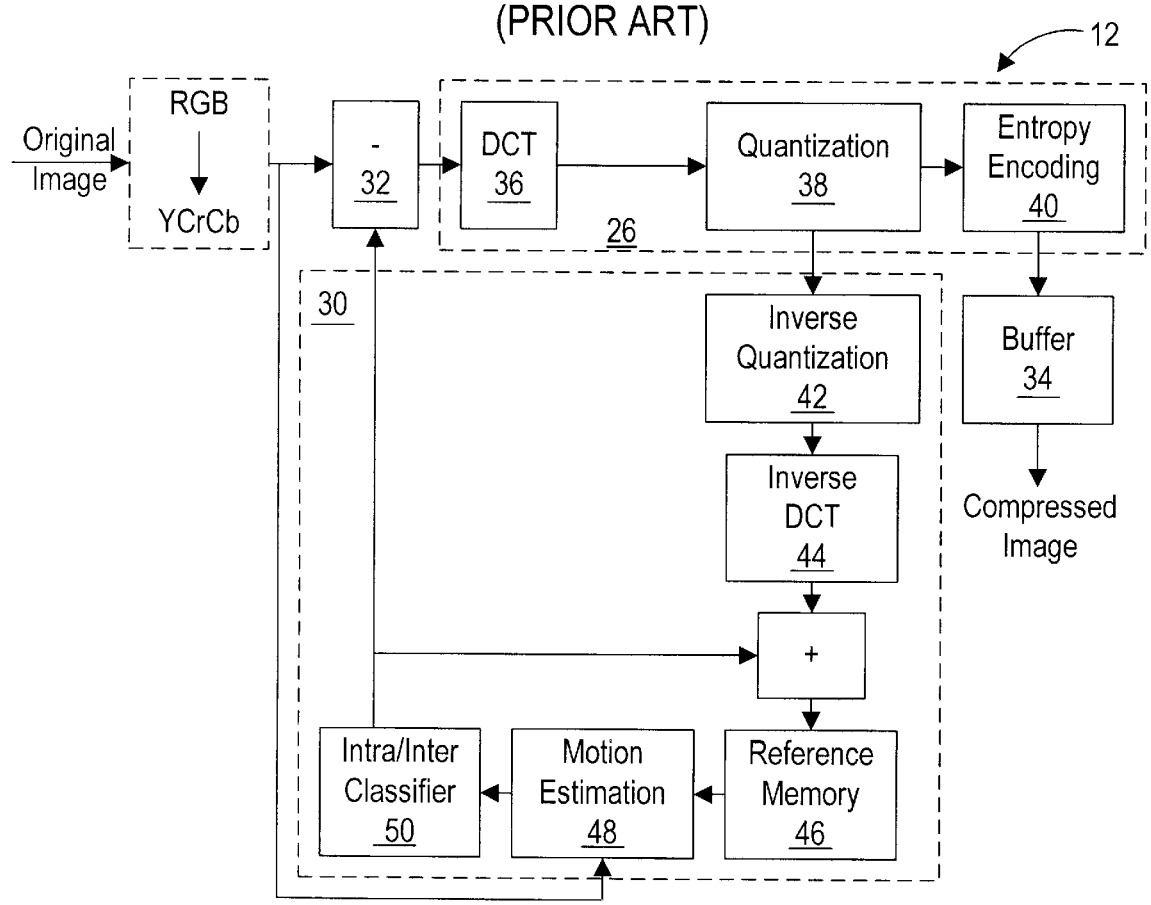
FIG. 2 is a block diagram of an image encoder.
Figure 3:
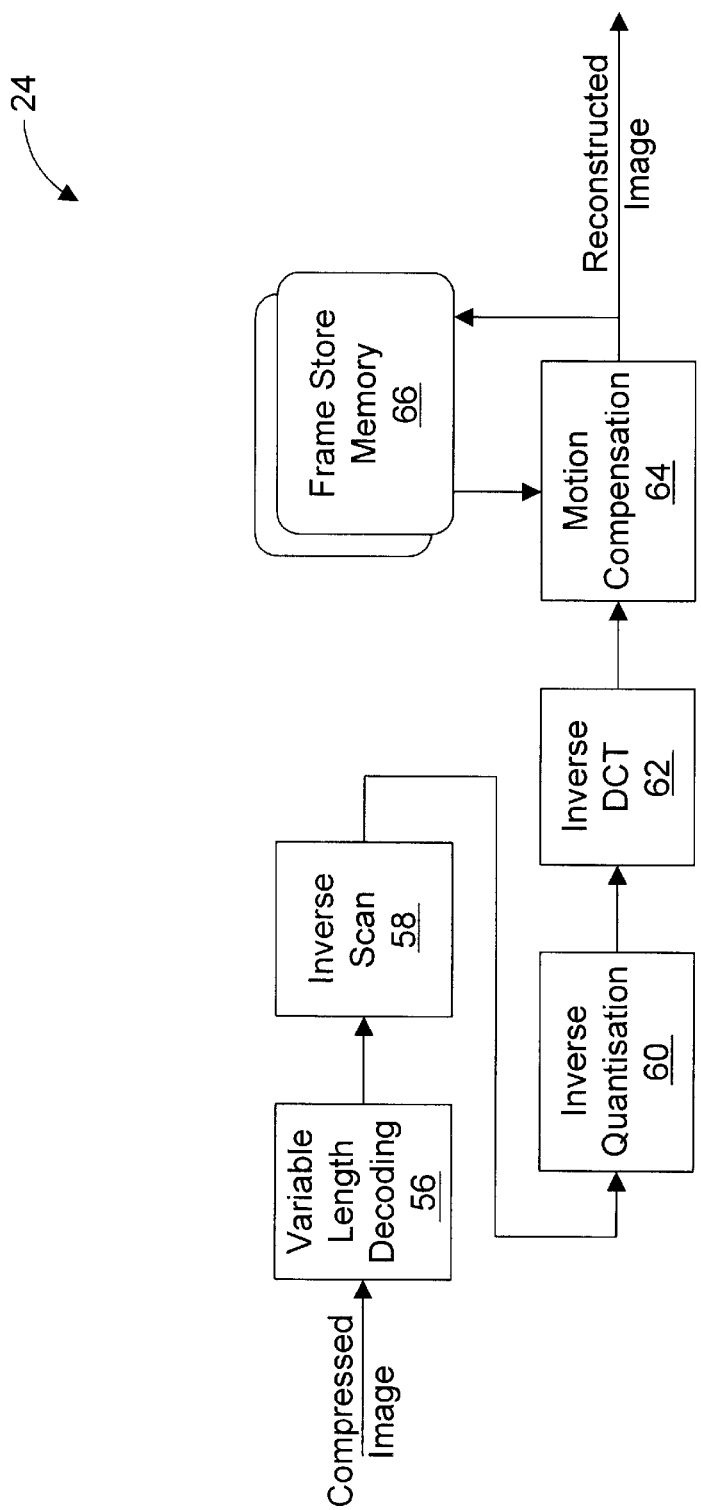
FIG. 3 is a block diagram of an image decoder.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 4:
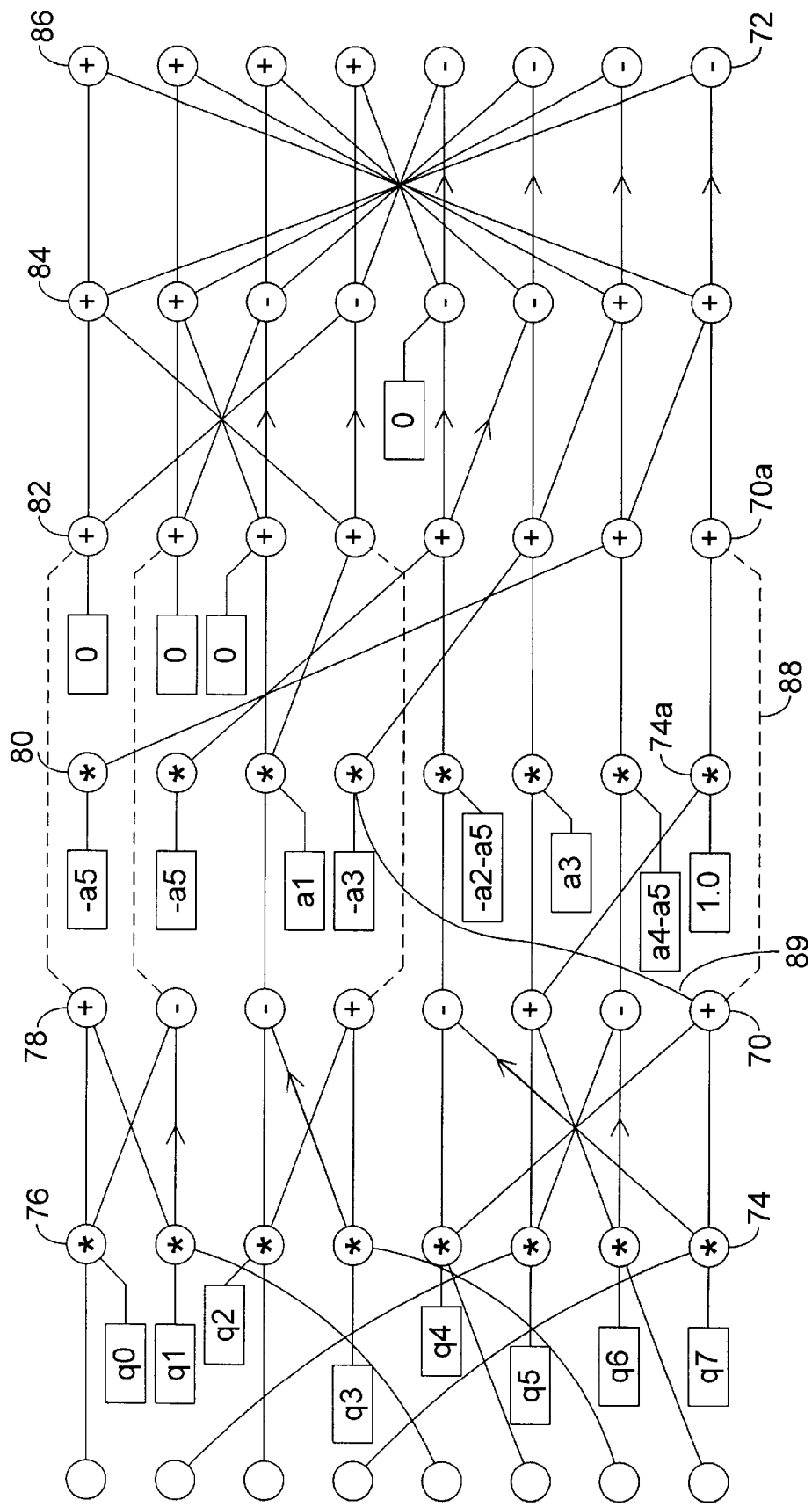
FIG. 4 is a flowgraph of a 1×8 IDCT algorithm performed in parallel on multiple operands according to an operand routing technique of the present invention.

Referring to FIG. 4, a flowgraph of a 1×8 IDCT algorithm is shown. The algorithm employs multiple add operations 70, subtract operations 72 and multiply operations 74, all of which are performed in no more than six instruction cycles labeled 76–86. According to the embodiment shown, each instruction cycle can perform up to eight operations. An additional accumulate/merge operation, is denoted by dotted lines 88. Thus, add operation 70a adds the contents resulting from add operation 70 to the output from multiply operation 74a to produce an accumulated output. Some of the add and subtract operations 70 and 72 are indicated as no operations ("no ops") whenever an input to that operation is an immediate 0 value. Likewise, multiply operations 74 can be designated no ops depending upon an immediate 1 input value.

FIG. 4 illustrates sixteen multiply operations 74 and thirty two add/subtract operations 70 and 72. Four of the add/subtract operations are no ops, and two of the add operations are accumulate operations, leaving 26 add/subtract operations in accordance with the operations allocated for a 1×8 IDCT computation. See, e.g., Bhaskaran, et al., "Image Compressions Standards and Architectures" *ACM Multimedia* 94, October, 1994. The IDCT computations shown in FIG. 4 are performed on 16-bit values, and includes inverse quantization. The MEU includes an ORU which routes operands in accordance with branches 89, shown in FIG. 4. The operands are routed from one vector to another vector (i.e., from slot to slot) so that they are optimally aligned for the operations performed on them. Each instruction cycle is shown to perform eight independent operations on eight separate operands. Two dissimilar types of operations can occur during each cycle. For example, both add and subtract operations can be performed in a given cycle on dissimilar operands. Thus, if IDCT requires more than one operation type be performed during each instruction cycle, two operation types are available to enhance IDCT throughput.

Figure 5:
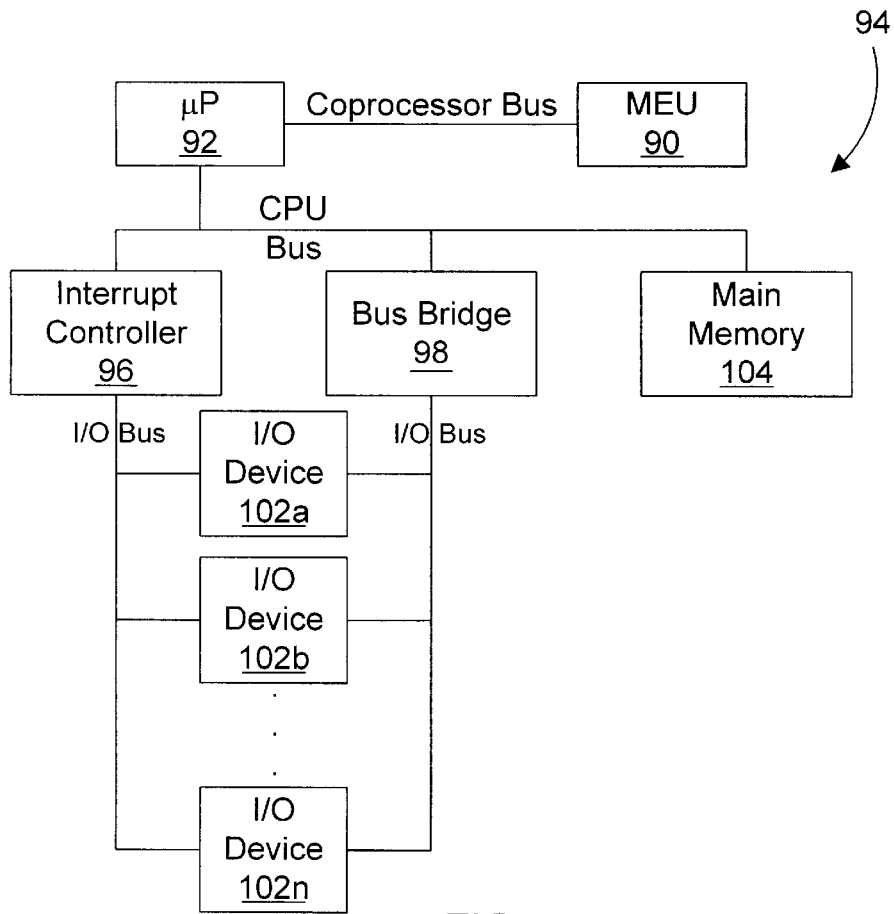
FIG. 5 is a block diagram of a computer system embodying a CPU linked, according to one embodiment, by a coprocessor bus to an MEU of the present invention.

Routing operands upon a partitioned ALU helps increase algorithm throughput. The mechanism for routing operands, however, is designed outside of, and is merely an extension of, a standard processor or CPU. Thus, routing of operands is performed by an MEU external to a CPU core or, if need be, external to the entire CPU monolithic circuit. FIG. 5 illustrates the latter instance in which an MEU 90 is linked via a coprocessor bus to a microprocessor 92. MEU 90 functions similar to a coprocessor floating point unit, but contains other features unique to multimedia operations. Microprocessor 92 includes any integer-based microprocessor, a suitable microprocessor being one designed in accordance with the x86 microprocessor architecture developed by Intel Corp. MEU 90 and microprocessor 92 thereby form a computer system 94 having both hardware and software components. To receive external input and/or to operate upon a stored sequence of instructions, computer 94 includes units peripheral to a CPU bus such as an interrupt controller 96, a bus bridge 98, and a plurality of input/output devices 102a–n. A CPU bus, often referred to as the system bus, couples microprocessor 92 to controller 96 and bus bridge 98, as well as main memory 104. I/O devices 102a–102n are coupled to controller 96 and bus bridge 98 via the I/O bus.

I/O devices 102 typically require longer bus clock cycles than microprocessor 92 and other devices coupled to the CPU bus. Thus, bus bridge 98 includes any device which can provide a buffer between the CPU bus and the I/O bus. Additionally, bus bridge 98 translates transactions from one bus protocol to another. A popular I/O bus includes the EISA or PCI bus. I/O devices 102 involve any device which can interface between computer 94 and other devices external to the computer, and include a modem, a serial or parallel port, etc. Main memory 104 includes at least one RAM array of cells and a RAM controller.

Generally speaking, microprocessor 92 executes sequences of instructions ("programs") stored in main memory 104 and operates upon data stored in main memory 104. Concurrently, MEU 90 also operates upon instructions within main memory 104. The instructions unique to MEU 90 are deemed vector instructions useful in performing, for example, data compression or transformation operations, such as IDCT shown in FIG. 4.

When embodied upon a separate monolithic substrate, MEU 90 communicates to processor 92 via a coprocessor bus. As will be described, MEU 90 is scalable in its operation, and can perform any algorithmic or Boolean combination useful in data compression, correlation, convolution, FIR, IIR, transforms (FFT or DCT/IDCT), and/or matrix computations on a received signal. According to a preferred embodiment, the signal is an image (either still or full motion), whereby MEU 90 can perform fast matrix computation on picture elements within macro blocks of select image frames.

Figure 6:
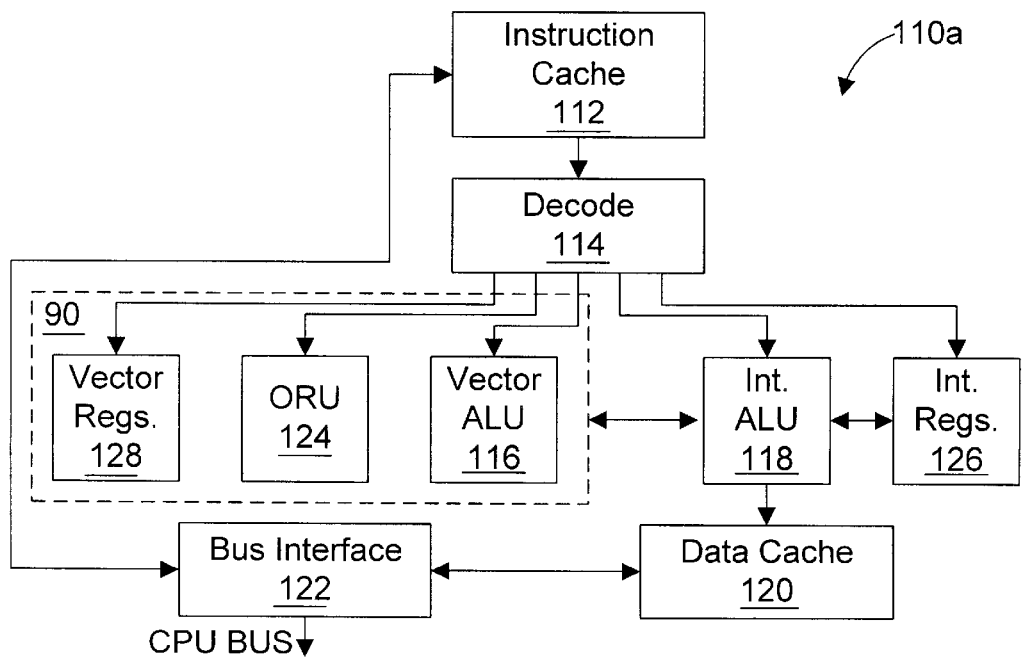
FIG. 6 is a block diagram of a scalar microprocessor having a decode unit for concurrently dispatching integer and non-integer instructions to an integer execution unit and an MEU of the present invention.

FIG. 6 illustrates an embodiment in which the MEU is formed as part of a microprocessor, preferably on the same monolithic substrate. The integer and non-integer (i.e., MEU vector) elements of the microprocessor are designed to execute instructions concurrently with one another. According to one embodiment, a processor 110a which includes both integer core and MEU features is shown in FIG. 6. Microprocessor 110a includes an instruction cache 112 coupled to a decode unit 114 which is in turn coupled to execution units (or arithmetic logic units) unique to integer and vector operations. Vector ALU 116 is shown as part of MEU 90, and integer ALU 118 is shown as part of the integer core. Microprocessor 110a also includes a data cache 120 coupled between the integer ALU 118 and a bus interface unit 122. Of course, there can be numerous other functional blocks associated with microprocessor 110a such as, for example, register files and writeback stages associated with the integer ALU 118.

Instruction cache 112 is a high speed cache memory capable of storing and retrieving instruction code. It is noted that instruction cache 112 may be configured as a set-associative or direct-mapped cache. Instructions fetched from instruction cache 112 are transferred to decode unit 114 which decodes the instructions to determine the operands used by the instruction as well as to bit-encode the instruction for the execution units of vector ALU 116 and integer ALU 118. Decode unit 114 fetches register operands from register files (either vector registers or integer registers). Within MEU 90, ORU 124 re-aligns the operands within one source register prior to their entry into vector ALU 116. In this manner, vector ALU 116 receives register operands during the same clock cycle that it receives instructions.

In addition to fetching register operands, decode unit 114 routes each instruction to integer ALU 118 or vector ALU 116 based on the type of instruction encountered. Vector instructions are routed to vector ALU 116, while integer instructions are routed to integer ALU 118. Integer ALU 118 may include an execute stage and a writeback stage. The execute stage executes the instructions provided by decode unit 114, producing the result. Integer ALU 118 often utilizes a memory operand, wherein the memory operand is transferred from data cache 120 prior to execution of the instruction. The writeback stage stores the result generated by an execute stage into a destination register specified by the instruction. The destination of an MEU operation (i.e., vector operation) is generally a destination register within vector registers 128. Vector store instructions have a destination in main memory 104 (shown in FIG. 5), a copy of which may be stored in data cache 120. Similarly vector load operations have a source operand in main memory 104, a copy of which may be stored in data cache 120.

Vector ALU 116 responds to a decoded instruction code, and the vector ALU result is written to a destination specified by the vector instruction. More particularly, decode unit 114 provides control signals regarding operand routing to ORU 124 and control signals regarding instruction operation to vector ALU 116. These control signals are generated according to the vector instruction fetched from instruction cache 112. An exemplary vector instruction encoding is provided hereinbelow.

Integer register 126 is configured to store register operands for use by integer ALU 118. In one embodiment, registers 126 store the x86 register set which includes the EAX, EBX, ECX, EDX, EBP, ESI, EDI and ESP registers. Additionally, integer registers 126 may store the segment registers of the x86 architecture, as well as other miscellaneous registers. Conversely, vector registers may comprise the registers within the floating point unit. According to one embodiment, vector registers 128 comprise eight of the 80-bit floating point registers available in an x87 architecture. According to one embodiment, two 80-bit registers are coupled together to form a 160-bit register and a 160-bit data bus connecting vector registers 128 and vector ALU 116. Each slot of each vector register can store a 20-bit operand which comprises a fixed point number. The fixed point number is a non-integer number, wherein the binary point is immediately right of the leftmost bit (the leftmost bit is reserved as a sign bit). Conversely, integer numbers define the binary point immediately right of the rightmost bit. The fixed point values thereby range between $-1.0$ to $+1.0$. It is known that integer values typically exceed 1.0 or are less than $-1.0$ by incremental integer (non-fractional) amounts.

Bus interface unit 122 is configured to effect communication between microprocessor 110a and devices coupled to the CPU bus. For example, instruction fetches which miss instruction cache 112 may be transferred from main memory attached to the CPU bus by bus interface unit 122. Similarly, memory operations which miss data cache 120 may be transferred from main memory by bus interface unit 122. Additionally, data cache 120 may discard a cache line of data which has been modified by microprocessor 110a. Bus interface unit 122 transfers the modified line to the main memory.

Figure 7:
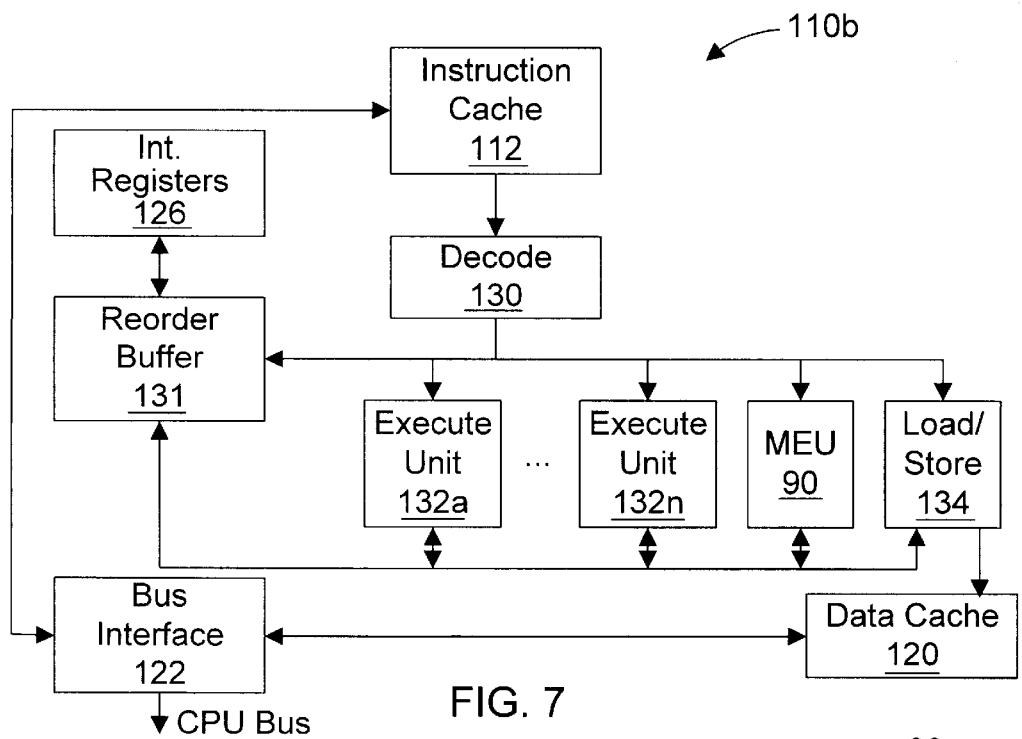
FIG. 7 is a block-diagram of a superscalar microprocessor having a decode unit for concurrently dispatching multiple integer instructions along with non-integer instructions to respective integer and MEU execution units of the present invention.

Turning now to FIG. 7, microprocessor 110b is shown according to an alternative embodiment. Similar to microprocessor 110a, microprocessor 110b includes a bus interface unit 122, an instruction cache 112, a data cache 120, and integer registers 126. Bus interface unit 122 is coupled to instruction cache 112 via an instruction transfer bus. Similarly, bus interface unit 122 is coupled to data cache 120 via a data transfer bus. Additionally, microprocessor 110b includes a multiple instruction decode unit 130 coupled between instruction cache 112 and a plurality of execution units 132a–132n. A load/store unit 134 is included to interface between execution units 132 and data cache 120.

Microprocessor 110b includes a reorder buffer 131 coupled to decode unit 130, execution unit 132 and load/store unit 134. The reorder buffer 131 allows concurrent execution of multiple integer instructions carried forth in what is generally termed a "superscalar" architecture. Decode unit 130 therefore concurrently decodes multiple instructions and dispatches the instructions to the appropriate execution unit 132a–132n. Additionally, decode unit 130 dispatches vector instructions to MEU 90 concurrent with the integer instructions. A storage location within reorder buffer 131 is allocated for each decoded and dispatched instruction. The storage locations are allocated to instructions in the order in which they occur within a task, so that the results created by executing instructions may be stored into register file 126 or data cache 120 in program order. By including reorder buffer 131, instructions may be speculatively executed out of order by execution units 132. Thus, in one embodiment, MEU 90 is designed to operate concurrently with multiple issued instructions, speculatively executed out of order by multiple execution units 132. The superscalar architecture shown in FIG. 7, as it applies to speculative execution, is well known; however, the addition of an MEU execution unit presents additional advantages unique to both high speed conventional processors and DSPs.

Figure 8:
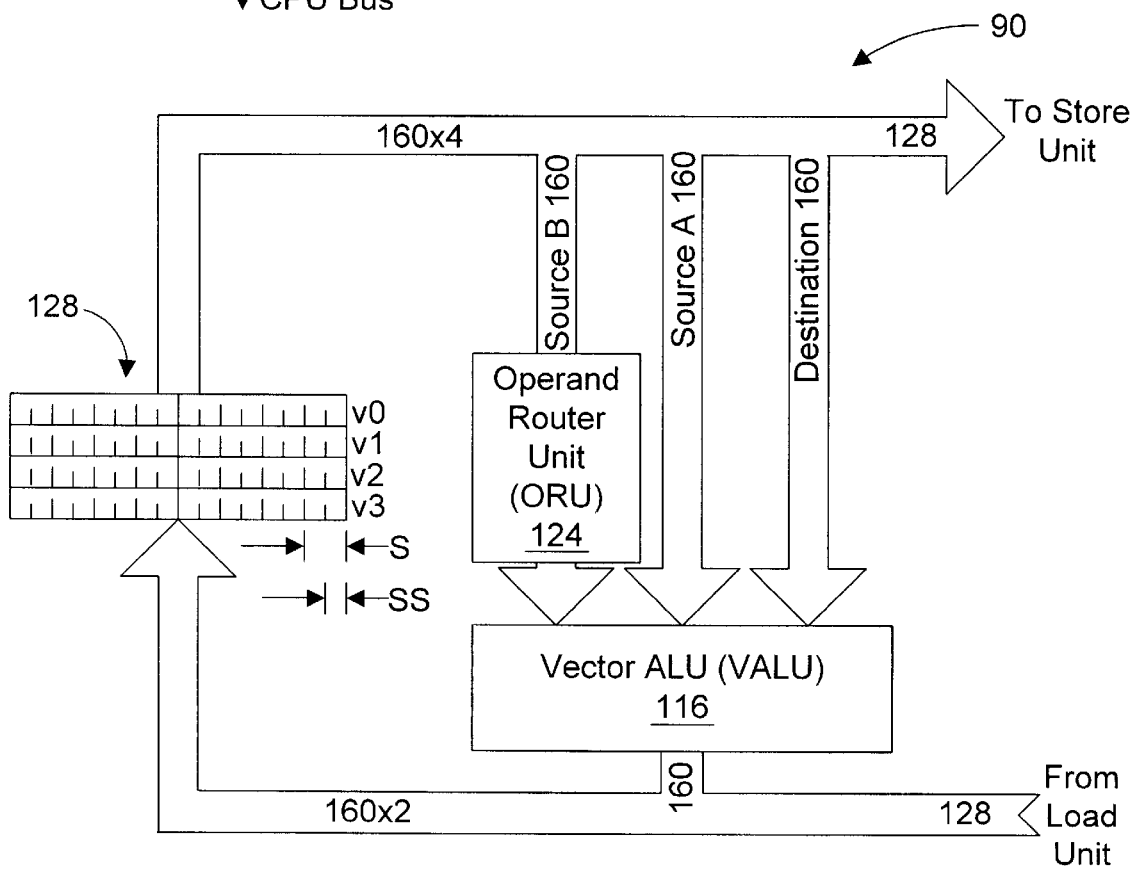
FIG. 8 is a block diagram of an MEU having a series of vector registers, an ORU, and a vector ALU according to the present invention.

Turning now to FIG. 8, data paths connecting various components of MEU 90 are shown according to one embodiment. Advantages illustrated by features of FIG. 8 include, for example, a structure by which vector instructions can operate upon 160-bits of data at a time, operand slot and sub-slot segregation of the 160-bit wide registers, saturating arithmetic performed on operands of fixed-point values, support for data scaling from 8/10 bit to 16/20 bit values, multimedia-type vector instructions and their impact on arithmetic operations, operand routing and operand loading/storing. In a full implementation, microprocessor 110a or 100b can perform up to sixteen 10-bit arithmetic operations per instruction cycle. In less than a full implementation, the registers can be 80-bits wide or 40-bits wide rather than 160-bits wide to save silicon space at the expense of performance. In the later instance, eight or four 10-bit arithmetic operations, respectively, can occur per clock cycle. In a full implementation which performs sixteen operations per cycle, a microprocessor operating at 150 MHz can give a peak performance of 2.4 billion calculations per second. The concept of using partitions of various sizes (i.e., 10-bit or 20-bit operands) or a variable number of registers, ORU multiplexers and vector ALU logic portions is referred to as scalability - - - an important advantage of the present invention.

In order to minimize the hardware and software impact upon existing processor or coprocessor cores, MEU 90 may use the pre-existing registers of many existing floating point units. Vector instructions treat the registers slots as containing small fixed-point data values rather than large floating-point numbers. Since operating systems save the entire state of the floating point unit as necessary during context switches, the operating system does not need to be aware of the new functionality. It is important to note that the MEU and floating point unit do not necessarily need to share vector ALU logic or vector registers. The microprocessor could simply have a mechanism that maintains coherency between the vector register values in completely separate MEU and floating point unit sections.

There are several advantages in reusing the floating point unit registers as vector registers 116. First, floating point unit register files can hold almost three times as much data as integer registers, and can be used concurrently with the integer registers. Second, the MEU implementation does not impact or change the integer registers or load/store units. Thus, the MEU can be optionally included or excluded from almost any conventional microprocessor as merely an "extension" to the processor core. An advantage of applying the MEU to existing processors is for reasons of scalability or modularity. MEU performance can be readily changed to fit the application without changing the processor whatsoever. Third, MEU instructions issued on the floating point unit register occur concurrently with integer instructions issued upon the integer registers so as to obtain maximum utilization of all microprocessor logic. MEU 90 is used to perform large numbers of parallel computations while the integer units (integer ALU and integer registers in scalar form or integer ALU, integer registers, load/store, reorder buffer, etc. in superscalar form) perform addressing calculations and program flow control. Parallel computations in the MEU occurs simultaneous with addressing and program flow control without hindering the normal operations of microprocessor 110a or 110b. Fourth, the MEU does not define any new microprocessor states, control or condition code bits other than a global MEU extension enable bit.

In high performance implementations, all eight of the 80-bit floating point registers are utilized, and the registers are accessed in pairs. This effectively creates four 160-bit vector registers 116, denoted in FIG. 8 as v0 through v3. Bit coding is reserved in the MEU instruction format for future expansion to possibly eight 160-bit vector registers. The extra registers would be used to implement future performance enhancements such as software pipelining.

Each of the 160-bit registers are partitioned according to a preferred embodiment into eight 20-bit slots or sixteen 10-bit sub-slots. In order to operate upon a slot or a sub-slot, a partitioned ALU is necessary. The partitioned ALU, denoted as vector ALU 116, is divided into separate logic units which perform discrete operations. In order to route slots within a rather large 160-bit register, a slot router or ORU 124 is necessary. ORU 124 serves to change the order of 20-bit operands within slots of a source B 160-bit register. Operands within slots of source B register are reordered or aligned with operands within slots of source A register or destination register, each register of which are 160-bits in length and contains 20-bit slots. For example, if bits within the first slot of source B register are to be added with the bits within the second slot of source A register, ORU 124 reorders the operand bits in slot 1 to slot 2 of source B register consistent with slot 2 of the source A register. Vector ALU 116 then combines slot 1 of source A register with slot 1 of source B register, slot 2 of source A register with slot 2 of source B register, and so forth. A single vector instruction controls routing of each partition or vector applied to ALU 116. ORU 124 operates on operands within source B register (either v0, v1, v2 or v3) as the operands are fed into vector ALU 116. ALU 116 and ORU 124, in combination, allow a microprocessor to execute an algorithm in a fashion that directly follows the algorithm's flowgraph representation. Extraneous move, load and shift operations are therefore substantially minimized. At each level in the flowgraph, such as the flowgraph of FIG. 4, ALU 116 operates on the nodes within the flowgraph and ORU 124 implements the diagonal interconnections. This feature provides high performance and makes MEU 90 easier to program at the assembly-language level, since the instructions map directly onto an algorithm's flowgraph representation.

In a lower performance implementation, MEU 90 can be formed with 80-bit or 40-bit data paths. Instead of performing eight computations within a single cycle, the lower performance implementation can operate on pairs of four or two operands. Thus, two or four clocks may be needed for each vector instruction, given the lower performance implementation. The scalability benefit of variable performance allows use on many types of algorithms. For example, there may be algorithms in which fewer than eight operations are needed in a single cycle, in which case 80-bit or 40-bit registers would serve that application. At the highest end, as many operations as possible (i.e., eight) are performed in a single clock cycle. There also may be instances in which multiple MEU units 90 might be considered to further enhance performance. A lower performance implementation requires a lesser amount of added die size since fewer multiplexers are needed in ORU 124, and fewer partition logic elements are needed in vector ALU 116. The performance vs. die size tradeoff can therefore be adjusted to suit the intended application for any particular scalar or superscalar microprocessor. There is considerable risk involved in doing enhancements that provide a fixed performance increase relative to the core microprocessor. As data compression formats change, and demands upon DSPs change, present performance-enhancing architectures will not be sufficient unless they are scaleable - - - either in terms of hardware scale or partition data size. By adding a flexible performance MEU 90 to a low end processor core, a cost competitive, and relatively inexpensive DSP is accomplished within the existing processor framework. The DSP/processor advantageously uses the same enhanced x86 instruction set that was developed for the host processor, thus greatly reducing software development cost.

Vector ALU 116 can support a three-operand instruction format. Operations such as addition, subtraction, multiply and shift utilize operands from source A and source B as the input to ALU 116. However, other operations, such as multiply-and-accumulate combine operands within a source register with operands within the destination register, wherein the destination register is the implied third operand to ALU 116. The written result can be immediately stored and used for subsequent operations without involving unnecessary move instructions between registers or stores to memory.

ALU 116 supports heterogeneous operations on the partitioned registers 128. According to one embodiment, two types of operations can be performed in a single instruction. These operations can be assigned to each operand within each slot (or sub-slot) of each source register. For example, four additions and four subtractions can be performed in a single cycle upon eight pairs of operands. By having capability of two operation types, it is easier to map algorithms containing numerous dissimilar operation types onto each instruction cycle. Thus, if two adds and six multiplies are needed, followed by four adds and four multiplies, the heterogeneous operation scheme hereof can perform these operations within two cycles, rather than having to separate the operations into four cycles.

Figure 9:
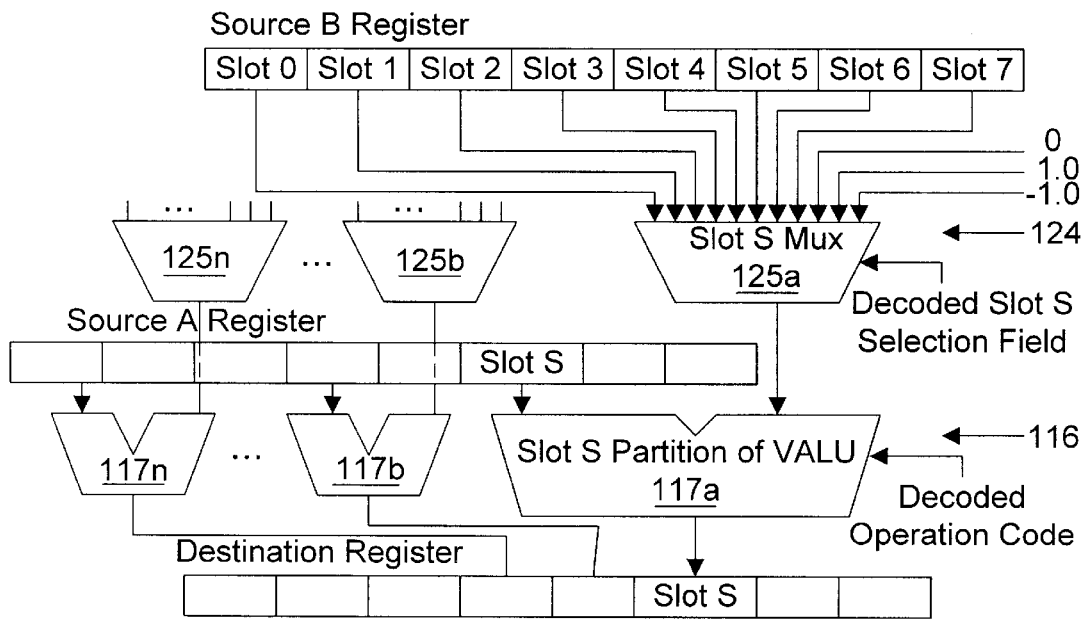
FIG. 9 is a block diagram of operands within a source B vector register routed by the ORU and operated upon by the vector ALU.

FIG. 9 illustrates in more detail ORU 124 and ALU 116. It would be difficult for software alone to take advantage of the raw number of micro instructions per second offered by ALU 116 without a means to flexibly move operands within and between large 160-bit registers. Operand routing is more critical for a vector processor (i.e., a vector ALU employing vector registers) than normal scalar processors which employ a smaller integer ALU and integer registers. Scalar processors can use memory addressing to randomly access individual operands; however, a vector processor must load data from memory in larger monolithic bit streams. Without the ability to flexibly access and route individual operands, algorithms often must be structured to perform a single operation on a larger portion of the data before moving on to the next operation. This puts a substantial burden on the memory load and store bandwidth because the intermediate results between operations do not all fit in the vector register file. Moreover, the memory reference pattern for this mode of calculations tend to use "stride" patterns that are highly inefficient in cached architecture. The typical workaround for this problem would be to perform large numbers of intra-register moves that consume clock cycles without doing useful calculations. To solve this problem, ORU 124 is devised, wherein ORU 124 "swizzles" bits within slots of vector registers as data moves through the ORU. Swizzling or realigning the data allows the operands to be shuffled as needed by the algorithm concurrently with ALU 116 arithmetic operations. MEU 90 can thereby load data slots, do a variety of operations between data slot elements, and then store the final result without involving numerous memory accesses. Load/store units are therefore less likely to be overloaded, leaving free bandwidth for the x86 integer ALU and integer registers to do basic addressing, execute, and writeback operations.

FIG. 9 indicates ORU 124 as comprising a series of multiplexers 125a–125n, which may be thought of as essentially an 8×8 crossbar switch with some enhancements. Each multiplexer of ORU 124 selects one slot s of a plurality of slots, labeled in FIG. 9 as slot 0 through slot 7. Each slot contains either one 20-bit partition or two 10-bit partitions (i.e., two sub-slots), depending upon the partition width specified in the vector instruction. For 10-bit partitions, the MEU 90 simultaneously performs independent but identical types of operations (i.e., two adds, two subtracts, etc.) on sub-slot pairs within each slot.

FIG. 9 indicates selection of slot s from slots 0 through 7 of the source B register. One of the logic portions 117a–117n of ALU 116 combines the selected slot with another slot s within source A register. The result of that combination is presented to slot s of the destination register. Each input to logic portions 117, or each slot in the destination register can independently receive one of eleven values: a value in one of the eight source slots, immediate 0, immediate 1.0 or immediate −1.0. The opcode mnemonic uses a character to represent each choice. Thus, given the above order, the mnemonic is represented as 01234567ZPN. Each ORU mnemonic uses eight of these characters to represent the routing operation. The following code illustrates a simple copy operation followed by an operation that would interleave the low half sub-slot of one register with alternating 1 and −1 values:

```
;copy v1 to v0
{mov mov mov mov mov mov mov mov} word v0, v1, v1(76543210)
;move half of v1 to v3, performing interleave with 1's and −1's
{mov mov mov mov mov mov mov mov} word v3, v1, v1(P3N2P1N0)
```

Referring to FIGS. 6–9, slot s is decoded from a vector instruction within instruction cache 112 by decode unit 114/130. The decoded instruction is forwarded to ORU 124, and specifically to the multiplexers 125a–125n, to select a slot s as shown in FIG. 9. Likewise, the same vector instruction is decoded and forwarded to vector ALU 116, and specifically to logic portions 117a–117n, to select an operation upon the operands within the selected slots. Accordingly, an instruction which decodes a slot (or sub-slot) for routing to the ALU and which decodes an operation upon those routed slots (or sub-slots) is defined as a vector instruction. There are two classes of vector instructions defined for the MEU: vector operational instructions and vector load/store instructions.

Vector operational instructions use a single opcode format for simultaneously controlling ALU 116 and ORU 124; this format is approximately 8 bytes long. Each instruction encodes the two source registers, the destination register, the partition size, and the operations to be performed on each partition. In addition, each instruction encodes the ORU routing settings for each of the eight slots. According to a preferred embodiment, the following represents a vector operational instruction coding format which occurs after the 0Fh F8h opcode:

0000s0aa 0bb0dd0x xxxxx0yy yyyypppp ppppAAAA AAABBBBB BBCCCCCC CDDDDDDD where,

0=reserved; must be zero
s=partition size (10 or 20 bits)
aa=sourceA register
bb=sourceB register
dd=destination register
xxxxxx=first operation code
yyyyyy=second operation code
ppppppp=1-bit operation selects for 8 slots (op xxxxxx or yyyyyy)
AAAAAAA to DDDDDDD=router slot selection fields It is noted that selection of a slot by ORU 124 is coded by fields described above as AAAAAAA to DDDDDDD. The slot selection field format utilizes 7-bits to represent the eleven possible routing values of source B slots 0–7, immediate 0, immediate +1 and immediate −1 for two slots. Use of 7-bits maximizes the coding density by coding pairs of slots within each field.

Slot selection fields are best described in reference to an example. An exemplary encoding can be presented to ORU 124 for each slot in order to select one of the eight source B slots, or one of the immediate values as follows:

0000→slot 0 of source B
0001→slot 1 of source B
0010→slot 2 of source B
0011→slot 3 of source B
0100→slot 4 of source B
0101→slot 5 of source B
0110→slot 6 of source B
0111→slot 7 of source B
1000→+1.0
1001→−1.0
1010→0

Coding each destination slot source B operand independently would thereby require 4*8=32 bit. However, since there are only eleven possibilities per destination slot, two destination slots' encoding may be combined into a field AAAAAAA to DDDDDDD. The fields are used to generate encodings for select pairs of slots using one 7-bit field for each pair as follows:

Field A=destination slots 0 & 1
Field B=destination slots 2 & 3

Field C=destination slots 4 & 5

Field D=destination slots 6 & 7

For example, consider field A. Field A has 7-bits numbered 0 through 6. Examination of bit A(6) reveals that if it is set to a 1, then both slot 0 and slot 1 use source B register slots as follows:

slot 0 encoding=0A(5)A(4)A(3)

slot 1 encoding=0A(2)A(1)A(0)

If A(6) equals 0, then examine A(5) and A(4), such that if A(5) equal 1 and A(4) equals 1, then each of the slot 0 and 1 use one of the immediate values as follows:

slot 0 encoding=110A(3)A(2)

slot 1 encoding=10A(1)A(0)

If A(5) does not equal 1 or A(4) does not equal 1, then one of the slots uses a source B register slot and the other uses one of the immediate values. A(3) is used to determine which of the slots is which. If A(3) equals 1, then slot 0 uses a source B register and slot 1 uses an immediate value as follows:

slot 0 encoding=0A(2)A(1)A(0)

slot 1 encoding=10A(5)A(4)

If A(3) equals 0, then slot 0 uses an immediate value and slot 1 uses one of the source B registers as follows:

slot 0 encoding=10A(5)A(4)

slot 1 encoding=0A(2)A(1)A(0)

An example of how various codings of field A, given the above exemplary explanation, would route various slots of source B register to slot 0 and 1 is as follows:

| Field A coding 6 5 4 3 2 1 0 | slot 0 3 2 1 0 | slot 1 3 2 1 0 |
|---|---|---|
| 1 0 1 0 1 1 0 | 0 0 1 0 (slot 2) | 0 1 1 0 (slot 6) |
| 0 1 1 0 0 1 0 | 1 0 0 0 (+1.0) | 1 0 1 0 (0) |
| 0 1 0 1 0 0 0 | 0 0 0 0 (slot 0) | 1 0 1 0 (0) |
| 0 0 1 0 1 0 0 | 1 0 0 1 (−1.0) | 0 1 0 0 (slot 4) |

Fields B through D similarly encode source B operand selection for destination slots 2–7. Using an example to help explain a vector operational instruction, the mnemonics used to specify the operations performed on each slot, the source and destination registers and ORU routing for an exemplary two-operation type add/subtract instruction are as follows:

{sbr sbr add add sbr add sbr add} word v3, v2, v1(37P3Z1N2)

Routing is performed on source B slots and immediate values in accordance with an order 37P3Z1N2 to respective destination register slots 76543210. Thus, v3 is denoted as the destination register, v2 is the source A register, and v1 is the source B register. Slots for the operand specifier and the routing specifier are laid out in decreasing order from left to right, wherein operands in each of slots 7 and 6 receive a subtract (sbr) operation, operands in slot 5 receive an add operation, etc. The "word" symbol specifies that the instruction is performed on a 20-bit slot as opposed to a 10-bit sub-slot. A word is represented as two bytes, wherein each byte within memory is represented as 8-bits. When a byte (or two-byte word) is loaded into the registers, the byte or word is expanded to a 10-bit sub-slot or 20-bit slot, respectively. The routing specifier for source B using the example set forth above, is as follows:

dest.7←−sourceA (s=7)+sourceB (s=3)

dest.6←−sourceA (s=6)+sourceB (s=7)

dest.5←sourceA (s=5)+#1.0 dest.4←sourceA (s=4)+sourceB (s=3)

dest.3←−sourceA (s=3)+#0.0 dest.2←sourceA (s=2)+sourceB (s=1)

dest.1←−sourceA (s=1)+#−1.0 dest.0←sourceA (s=0)+sourceB (s=2)

A vector instruction can specify any two of various vector operations. Thus, each slot can be randomly assigned either of the two types of operations. For examples, operands in slots 0 through 3 could receive one operation type while operands in slots 4 through 7 receive another. There are numerous advantages in being able to apply two different operations within a single vector instruction, one of which is to enhance the flexibility by which operands are routed and operations performed. The following Table I defines each type of operation that can be used in a vector instruction:

TABLE I

Vector Operation Descriptions

| CATE-GORY | MNEMONIC | | | DESCRIPTION |
|---|---|---|---|---|
| Add | add add_ | | | add sourceA and sourceB partitions, place sum in destination. add_ arithmetically shifts the result right by one bit (computes average). |
| Subtract | sub sub_ sbr sbr_ | | | subtract partitions. Sub does sourceA − sourceB; sbr does sourceB − sourceA. Sub_ and sbr_ arithmetically shift the result right by one bit. |
| Accumulate /Merge | acum acum_ | | | add the contents of the destination register partition to the sourceB partition and place the sum in the destination. acum_ arithmetically shift the result right by one bit. |
| Negate | neg | | | negate sourceB partition and place in destination. |
| Distance | dist | | | subtract partitions then perform absolute value. |
| Multiply | mul mac | | | mul multiplies the sourceA partition by the sourceB partition and places the product in the destination. mac multiplies sourceA by sourceB and adds the product to the destination. |
| Conditional Move | mvz mvnz mvgez mvlz | | | conditionally move partition in sourceB register to partition in destination register depending on sourceA partition's relationship to zero. |
| Scale | asr n asl n | | | arithmetically shifts the operand in sourceB by amount n. N can be between 1 and 4 inclusive. asl uses saturating arithmetic and shifts zeros in from the right. asr copies the sign bit from the left. |
| Logical Shift | lsr n lsl n | | | logically shifts the operand in sourceB by amount n. N can be between 1 and 4 inclusive. Zeros are shifted in from the left or right. Lsl uses modulo arithmetic; it does not clip. |
| Boolean | false nota xor nxor a true | nor anotb nand b aornb | bnota notb and borna or | perform one of sixteen possible Boolean operations between sourceA and sourceB partitions. (The operations are listed in order of their canonical truth table representations.) |

TABLE I-continued

Vector Operation Descriptions

| CATE-GORY | MNEMONIC | DESCRIPTION |
|---|---|---|
| Round | rnd n | add the constant (1*LSb << n – 1) to sourceB, then zero out the n lowest bits. n can be between 1 and 4 inclusive. Implements "round-to-even" method: If (sourceB<n:0>==010 . . . 0), then don't do the add. |
| SourceA Partition Shift | pshra | For each slot s, copy the contents of slot s + 1 from the sourceA register to slot s in the destination register. (If this operation is used in slot 7, then the result is immediate zero). This operation can be used to efficiently shift data inputs and outputs during convolutions (FIR filters, etc.) |
| Slot Routing | blbh ahbh albl | These operations are defined only for 20-bit partitions. They are used to route 10-bit data across the even/odd "boundary" that the ORU doesn't cross. Blbh swaps the upper and lower halves of the sourceB operand and places the result in the destination. ahbh concatenates the upper half of the sourceA with the upper half of sourceB. albl concatenates the lower half of the sourceA with the lower half of sourceB. |
| Store Conversion | ws2u | This operation is used prior to storing 16-bit unsigned data from a 20-bit partition. If bit 19 of sourceB is set, the destination is set to zero. Otherwise, this operation is the same as lsl 1. |
| Extended - Precision | emach emacl emaci carry | These operations are used to perform multiply-and-accumulate functions while retaining 36 bits of precision in intermediate results; they are only defined for 20-bit partitions. emach is the same as mac, except that no rounding is done on the LSb. emacl multiplies sourceA and sourceB, then adds bits <18:3> of the 39-bit intermediate product to bits <15:0> of the destination, propagating carries through bit 19 of the destination. emaci is similar to emacl, except that bits <19:16> of the destination are cleared prior to the summation. The carry operation logically shifts sourceB right by 16 bits, then adds the result to sourceA. |

There are several common operations which are desirable for vector ALU 116 to perform, and which comprise specific methods of using the operations defined in Table I. The specific uses are commonly referred to as aliases.

By way of example, a common desirable operation allows computation of the average of two given operands. The vector ALU 116 does not explicitly provide an average operation. However, vector ALU 116 implicitly provides an operation to take the average of two operands in that an add_ instruction does compute the average of two operands. This is due to the fact that the average of two numbers equals the summation of two numbers divided by two. Since the add_ instruction shifts the sum of the two operands right by one bit, it in effect performs the average operation useful as an alias. The following Table II illustrates some common operations that are aliases of those shown in Table I:

TABLE II

Operation Synonyms

| CATEGORY | ALIAS NAME | ACTUAL OPERATION | DESCRIPTION |
|---|---|---|---|
| Move SourceB | mov mov_ | b asrl | Move the sourceB register partition to the destination partition. Mov_ arithmetically shifts the result right by one bit. |
| Move SourceA | mova | A | Copy the partition in source A to the destination. |
| SourceA Absolute Value | absa | dist (. . . Z . . .) | Compute the absolute value of the sourceA partition. |
| Unmodified Destination | dest | acum (. . . Z . . .) | Leave the destination partition unchanged. |
| Average | avg | add | Compute average of two values. |

The various types of operations outlined in Tables I and II pose many advantages for DSP-type operations, and prove efficient in performing, for example, repetitive and sequential adds, subtracts, multiplies and shifts (moves). These types of operations are uniquely pertinent to, for example, operand routing, data compression, correlation, convolution and transformation operations. Normally, any two of the vector operations defined in the preceeding Tables I and II may be specified in a single vector instruction. Each slot can be randomly assigned either of the two operations, and the two sub-slots that share each slot always share the same operation. There is one case, however, where possibly four operations can be selected in one instruction. In this case, the four operations are predefined to be add, subtract, reverse subtract, and move. This special case is included because these four operations are typically found in individual stages of flowgraphs used for most DSP algorithms. Use of four distinct and differing operation types, or two differing operation types reduces the number of instructions needed to perform an algorithm.

Figure 10:
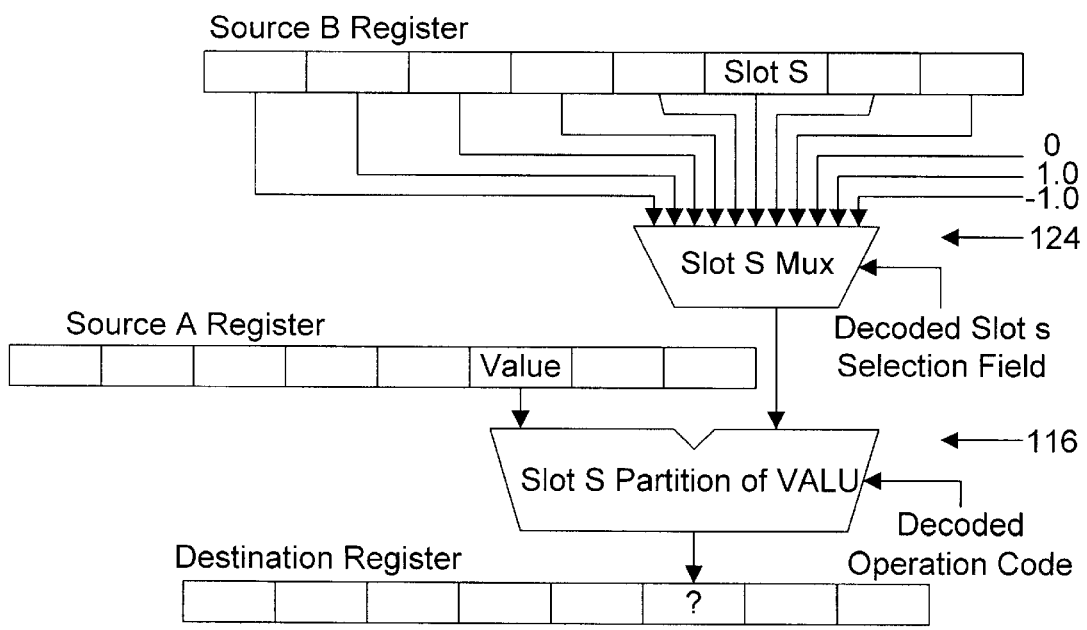
FIG. 10 is a block diagram of an operand undergoing a conditional move operation from source B register to destination register.

FIG. 10 illustrates in further detail a conditional move vector instruction designated in Table I as mvz, mvnz, mvgez, and mvlz. Depending upon the value within slot s of source A register, a move of the operand within slot s of source B register may or may not occur. The relationship of the value to zero determines whether or not the move will occur. A mvz instruction causes an operand from source B register to move to the destination register if the value of an operand within slot s of the source register is equal to zero. Alternatively, a mvnz instruction provides a move if the value of the operand within slot s of source A register is not equal to zero. Further, a mvgez instruction allows movement of an operand if the value of the operand within slot s of source A register is greater than or equal to zero. Yet further, mvlz instruction causes movement if the value of the operand within slot s of source A register is less than zero. The fixed point value within slot s of source A register therefore dictates the move. Since the value ranges from –1.0 to +1.0, comparisons and move operations can be readily performed. Thus, this operation is particularly useful as a comparater function. Comparisons are often needed as part of a logical shifting operation. Since there are often numerous shift operations which occur as part of a pixel format conversion, conditional moves play a substantial part in unpacking texture data from memory for use in calculation by the MEU. Probably the most significant advantage of conditional moves is the elimination of branch instructions. Modern CPUs must try to correctly predict branches (such as the branch instruction) to prevent stalls in the execution pipeline caused by re-executing speculative instructions. Any algorithm that makes decisions based on the values of input data (which usually are not very predictable) should try to do the decision without branching. By altering program behavior without branching, conditional moves therefore prove useful.

Figure 11:
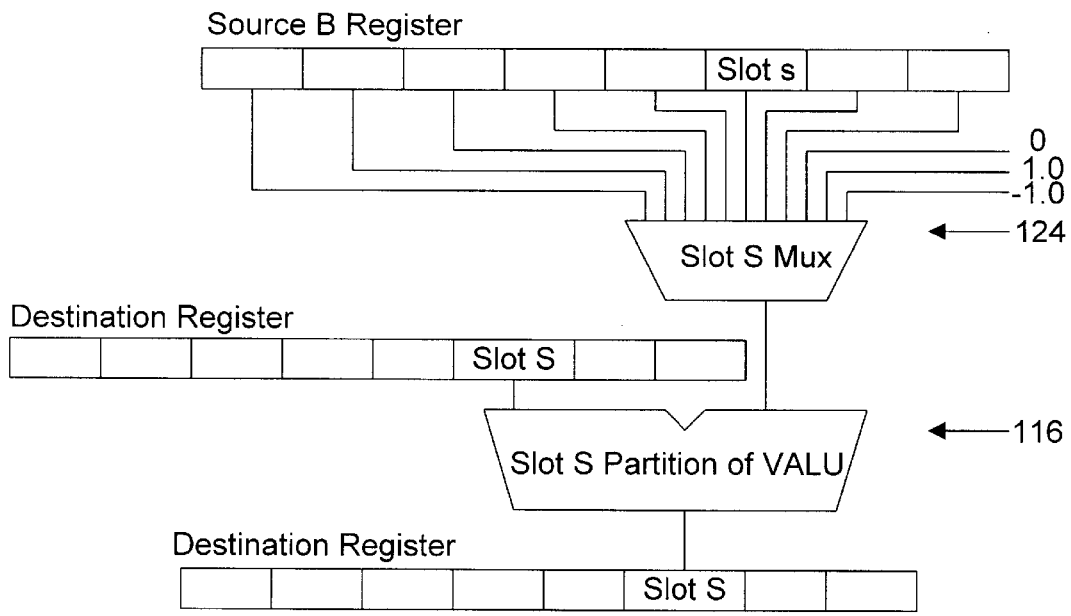
FIG. 11 is a block diagram of an operand undergoing an accumulate/merge operation, wherein the destination register provides an input to the vector ALU.

FIG. 11 illustrates in further detail an accumulate/merge instruction designated in Table I as acum and acum__. An accumulate operation allows the vector ALU 116 to treat an operand within the destination register as a third source operand. Thus, operands within a destination register not only receive accumulated values, but are also forwarded as source values into ALU 116. Using the destination register as an implied third source register thereby achieves an accumulate operation as part of an arithmetic operation. For example, FIR filters often accumulate products or sums to form cumulative totals. Accumulation is particularly useful during the latter stages of an algorithm when intermediate results are being merged into the final result. The amount of data in an algorithm tends to be larger in the middle (interim) of the operation than at the beginning or end. Thus, multiple vector registers tend to get used in the middle portions of the calculation. The acum instruction allows the final operation on an intermediate result register to be done concurrently with the merging into the final result. Without acum, this must be done with a move instruction that requires source A to be different from source B. It is less likely that useful arithmetic operations can be performed in parallel with moves.

The acum instruction is described as an operation which adds the value or contents within one slot of a destination register to the contents or value within another slot of a source B register. The combined results are then placed back into the same slot of the destination register from which they are fed. The instruction acum__ serves to arithmetically shift the combined result right by one bit. Shifting the result by one bit thereby computes the average value of that result. Using fixed point arithmetic, instead of the value being, e.g., 0.5, acum__ causes the binary value to shift to the right by one bit thereby forcing a 0.25.

Figure 12:
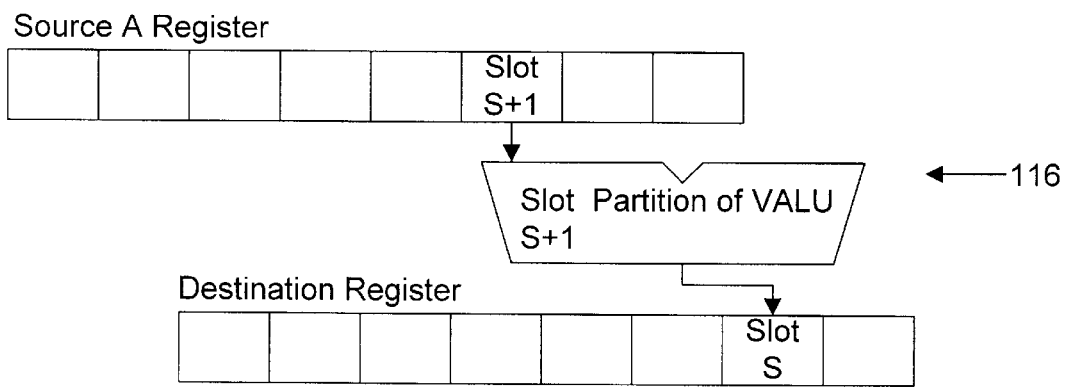
FIG. 12 is a block diagram of an operand undergoing a copy from partition s to partition s+1.

FIG. 12 illustrates in further detail pshra instruction shown in Table I. The pshra instruction is used to shift (or copy) the contents within slot s+1 of source A register to slot s of the destination register. If pshra is used to shift contents within slot 7 of the source A register, then an immediate 0 value will be shifted to slot 7 the destination register. The pshra operation is particularly useful as a right shift routine from slot-to-slot. More importantly, pshra moves data to an adjacent slot without involving the ORU. A single operational vector pshra instruction can concurrently move data across all the slots or select slots, depending upon the amount of movement required. This allows movement of data from one slot to an adjacent slot while simultaneously moving new data into the vacated slot. The pshra instruction does not involve the ORU. Instead, movement between registers occurs exclusively within the vector ALU. This is useful for certain serial operations found in, for example, FIR filter algorithms. Exemplary code for an inner loop of eight taps of an FIR filter algorithm involving the pshra instruction is as follows:

{mac mac mac mac mac mac mac mac} word v3, v1, v2 (77777777)
{mov pshra pshra pshra pshra pshra pshra pshra} word v1, v1 v0 (0ZZZZZZZ)

The mac instruction is a multiply-and-accumulate instruction shown in Table I. The mac instruction places the cumulative sum of source A and source B slot products into respective destination slots, where they are then shifted one slot location to the right. The shift operation is carried out by a mov instruction and seven pshra instructions. The mov instruction places an immediate zero value in slot 7 of the destination register, while pshra shifts slot values to the adjacent right slot in preparation for the next mac instruction. Serial shifting of data brings elements serially forward in the FIR algorithm. The pshra instruction is also useful in IIR filters when getting new data values, or in any algorithm where only one or a few new data values are added at each step.

Figure 13:
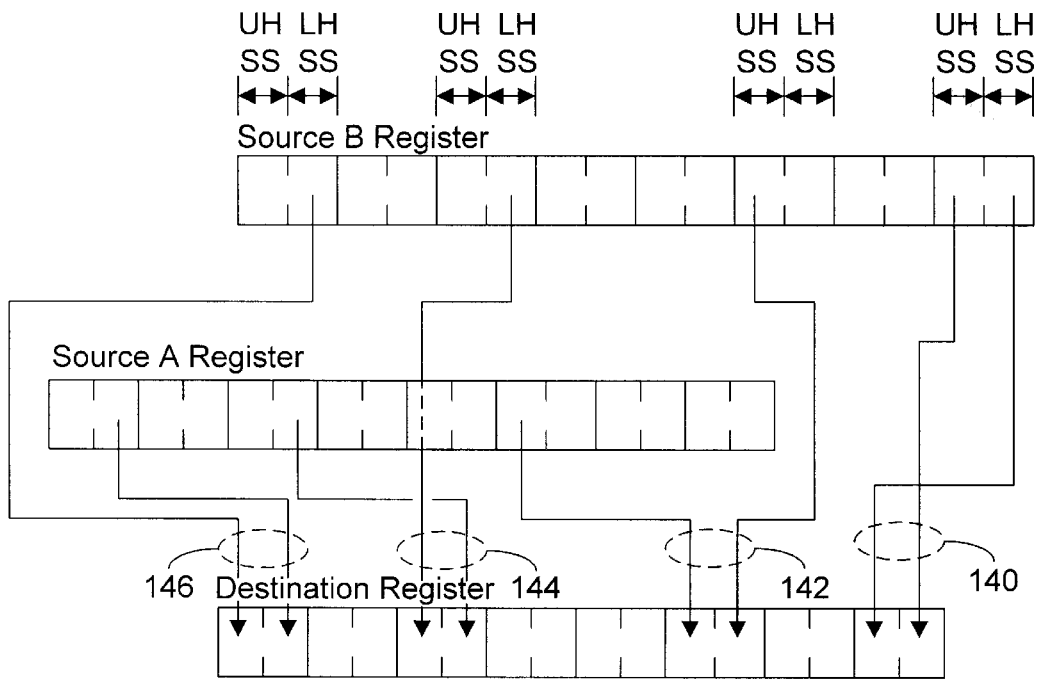
FIG. 13 is a block diagram of data within sub-slots being routed across sub-slot boundaries or concatenated with other register sub-slots to provide intra slot routing.

FIG. 13 illustrates yet another vector instruction useful in slot routing. More specifically, the instructions shown in FIG. 13 are useful for moving data between upper and lower half sub-slots of one or more slots. There are four exemplary instructions blbh, ahbh, albl and blal shown in FIG. 13 indicative of many slot routing instructions shown in Table I. There are sixteen possible permutations by which sub-slots within source B register, source A register or source A and source B registers are moved and placed within slots of a destination register. The operation blbh causes movement of certain operands in accordance with reference number 140. More specifically, blbh operation causes the lower half sub-slot within slot s of source B register to be placed in the upper half sub-slot of slot s within the destination register, while the upper half sub-slot of slot s within source B register is placed in a lower half sub-slot of slot s within the destination register. The term "bl" refers to the lower half sub-slot of source B register and since "bl" occurs first in the blbh series, routing is directed to the upper half sub-slot of the destination. If "bl" occurs last in, e.g., a bhbl series, then routing would be directed to the lower half sub-slot of the destination. The operation ahbh causes transfer of sub-slots to the destination register in accordance with reference numeral 142. Similar to other slot routing instructions, ahbh routes sub-slots from one slot of a source register to the same slot of the destination register. For example, slot routing occurs from sub-slots within slot 1 to sub-slots within slot 1, etc. Thus, ahbh causes slot s upper half data of source A to move to slot s upper half data of the destination simultaneous with movement of slot s upper half data of source B to slot s lower half data of destination register. Instruction albl is shown to cause movement of sub-slot data in accordance with reference numeral 144, while operation blal causes movement of sub-slot data in accordance with reference numeral 146. Instruction albl serves to concatenate the lower half sub-slots of the source registers as opposed to concatenating the upper half sub-slots resulting from instruction ahbh. The instruction blal concatenates in reverse order from the result produced by instruction albl.

ORU 124 serves to route slots; however, instruction such as blbh, ahbh, etc. serve to change the order of sub-slots within any of the routed slots. If the slots comprise 20-bit partitions, it is noted that not only can the order of the 20-bits be changed by the ORU with respect to other 20-bit slots, but 10-bit sub-slots within one or more of the 20-bit slots can also be reordered. As shown in FIG. 13, upper and lower halves of each slot within a destination register can be loaded separately or in reverse order by upper and lower half sub-slots within any of the source registers. Sub-slot routing is performed within the bounds of the same slot used as the source and destination slot.

Routing of data across upper and lower half barriers of one or more slots proves beneficial in MPEG motion estimation algorithms. Pixel format conversions within, for example, an intracoded I frame can be performed using logical shifting and byte format moves. Byte moves are performed on byte-sized data within sub-slots of various slots. A coded example of three instruction cycles used in converting four pixels from 16-bit 5:5:5 RGB format to 32-bit 8:8:8:8 αRGB format is as follows:

```
;expand pixels from lower half of vo to all of vo, making two
;copies of each and align R, G and B to 10 byte partitions
{lsl1 lsr4 lsl1 lsr4 isl1 lsr4 lsl1 lsr4} word vo, vo, vo(33221100)
;move dta into byte formats from word formats
(albl albl ahbh ahbh albl albl ahbh ahbh} word vo, vo, vo(54761032)
;zero out alpha, finish putting G and B into order
;finish lining up B, put each component in the correct byte, and zero
;out alpha
{mov mov bibh blbh mov mov blbh bibh} word vo, vo, vo(Z645Z201)
;optional step: zero out low bits to eliminate noise v1 slots=1111100000
{and and and and and and and and} byte vo, v1, v0(76543210)
```

The shift range n of lsl and lsr is limited to plus or minus four bit positions to minimize the size of the shifting logic, which also minimizes opcode size. Shifts from five to eight bits can be done with two insructions; shifts of nine or ten bits require three instructions; and, shifts larger than ten can be constructed with help from ORU 124.

The vector operational instructions set forth in Table I of which a few are described in FIGS. 10–13, are representative of operations useful in numerous DSP algorithms. However, to realize the full benefit of those operations, it is necessary that the vector instructions also include unique load/store vector instructions. To ensure data is optimally arranged from memory to the source registers or from source registers to destination registers, loading to particular slots or sub-slots is crucial. The load operation, or conversely the store operation, must be particularly attuned to fixed point values. Operations upon fixed point values use saturating arithmetic. Arithmetic upon signed fixed point values is represented in two's complement form, with the most significant bit being the signed bit.

Figure 14:
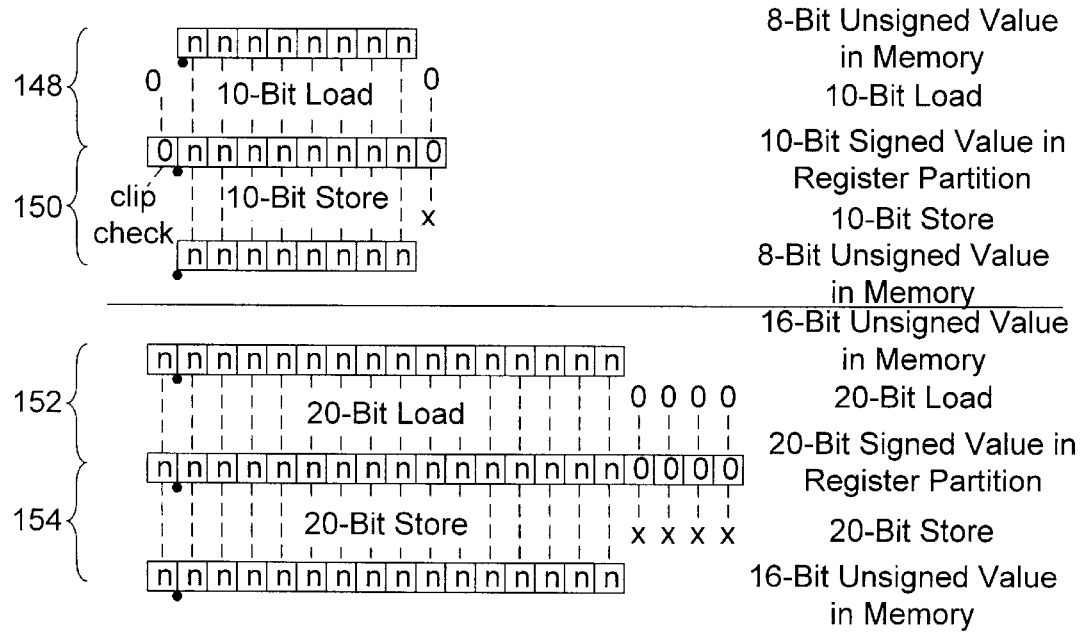
FIG. 14 illustrates expansion and truncation of bits during respective load and store operations.

The distinction between fixed binary point (i.e., fixed decimal point at the leftmost position to the immediate right of the sign bit) and integer operation is meaningful for multiplication operations. The binary point position is irrelevant for addition, shifting and Boolean operations. The binary point position shared by the product and either of the two factors of a multiplication operation is arbitrary. The hardware's behavior determines the binary point position of the remaining factor. FIG. 14 illustrates capability of the MEU in supporting either signed or unsigned data formats. As shown, an unsigned 8-bit data value can be loaded from memory to a register partition (either a slot or sub-slot depending upon the amount of unpacking required). If an 8-bit unsigned value is loaded into a 10-bit sub-slot, movement of bits during that load operation is shown by reference numeral 148. The memory from which the 8-bit value is loaded can be any storage device other than the vector registers. Generally speaking, memory is defined as semiconductor memory or random access memory. Store operation 150 serves to move data from the vector registers back to memory. All data is assumed to be in little-endian format. Loading of a 16-bit value from memory to a 20-bit slot is shown by reference numeral 152, and storing data values from a slot back to a memory is shown by reference numeral 154.

FIG. 14 illustrates load/store of either an 8-bit byte or a 16-bit word from memory to sub-slots/slots and back to memory. Distinct load/store instructions are defined for the two different partition widths. For 20-bit partitions, the MEU treats the memory word as a 16-bit signed value as shown by load operation 152. However, for 10-bit partitions, the MEU treats a memory byte as an 8-bit unsigned value as shown by load operation 148. The reason why an 8-bit byte is assumed to be unsigned and a 16-bit word is signed is to lessen the support necessary to take into account the large number of both signed and unsigned versions of both. In most cases involving image data, 8-bit values tend to be unsigned. For instances, most pixel values are 8-bit unsigned byte values. Conversely, 16-bit values tend to be signed, such as when those values represent an audio signal. A single instruction may be added following a load or before a store to perform format conversion from the default 8-bit unsigned or 16-bit signed format to the desired format, if necessary. An example of code which can perform such a conversion to 8-bit signed format is as follows:

vldw v0, mem 128
{lsl lsl lsl lsl lsl lsl lsl lsl} byte v0, v0, v0 (76543210)

The load instruction vldw places the actual sign bit just to the right of the binary point, and the vector logical shift instruction lsl moves the sign bit to the left of the binary point and pads the lowest bit with an immediate 0. For conversion to 16-bit unsigned format, the following code can be used:

vldw vo, mem 128
{lsr lsr lsr lsr lsr lsr lsr lsr} word v0, v0, v0 (76543210)

The load instruction vldw places the most significant bit in the sign location, and the vector logical shift instruction lsr shifts this bit back to the most significant bit right of the binary point and places a 0 into the sign bit.

Load 148 is shown in FIG. 14 to load an 8-bit unsigned value from memory across the data bus to bit locations 1–8 within the vector register partition. The signed bit and least significant bit are set to 0. The default 8-bit value is unsigned. As described above, if the signed/unsigned nature of the data does not match that assumed by the load instruction, then a separate logical shift operation can be used to translate the data after it has loaded. To load a 20-bit partition, a 16-bit signed value is drawn from memory, wherein the 16 bits are left justified and the four rightmost (least significant) bits are padded with zeros. As described above, if the 16-bit value is unsigned, then a 1-bit logical right-shift is performed after the load.

Store operations perform the opposite data conversions from loads. Stores from a 20-bit partition place the partition's left-most 16 bits into the memory word, ignoring the lowest four bits. Stores from a 10-bit partition first check the partition's sign bit (bit 9). If the sign bit is set, the MEU stores 0 to the memory byte thus clipping the negative value to 0. If the sign bit is not set, then the partition's bits 1–8 are directly placed in the memory byte. To store 8-bit signed data, a 1-bit logical right-shift must be performed prior to the store. To store 16-bit unsigned data, it is necessary to perform a left-shift and to clip negative values to 0 prior to the store.

Load and store instructions can therefore move up to sixteen 8-bit bytes between memory and a register partition (sub-slot) or can move up to eight 16-bit words between memory and a register partition (slot). For example, 8-byte loads and stores can be used to convert between byte-precision data and word-precision data.

There are numerous types of load and store instructions which can move 10-bit or 20-bit data between memory and the vector registers. Table III provides a listing of various load and store instructions as follows:

TABLE III

Load and Store Instruction Descriptions

| Instruction Type | Mnemonic Format | Description |
| --- | --- | --- |
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, mem128 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64. The upper half of each slot receives the memory values; the lower half of each slot is set to zero. |
| 16-Byte, 20-Bit Store | vstw mem128, vs | Store source register vs to 16 bytes of signed 16-bit data at address mem128. |
| 8-Byte, 20-Bit Store | vstw mem64, vsh | Store slots 4 through 7 of source register vs to 8 bytes of signed 16-bit data at address mem64. |
| 16-Byte, 10-Bit store | vstb mem128, vs | Store source register vs to 16 bytes of unsigned 8-bit data at address mem128. Data is stored using a 2:1 byte interleave pattern. |
| 16-Byte, 10-Bit store | vstb mem64, vsh | Store source register vs to 8 bytes of unsigned 8-bit data at address mem64. The upper half of each slot is stored to memory; the lower half of each slot is ignored. |

Figure 15:
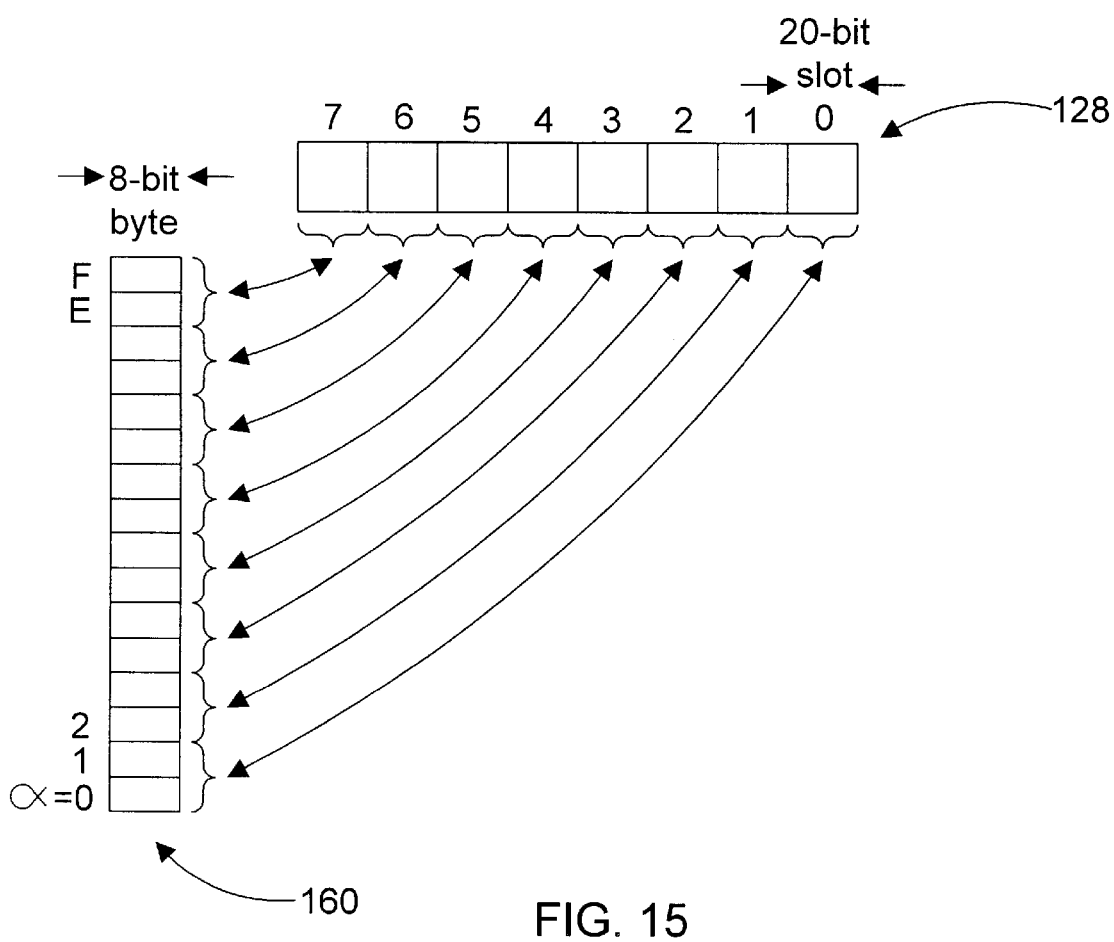
FIGS. 15–18 illustrate load and store operations which occur, according to various embodiments, between a vector register and memory.

FIGS. 15–18 illustrate in further detail the load/store instructions set forth in Table III. Movement of data in accordance with vldw vd, mem128 and vstw mem128, vs instructions are shown in FIG. 15. 8-bit bytes 0 through F(hex) can be loaded in various ways from memory 160 to slots 0 through 7 of a vector register 128. Instruction vldw vd, mem128 provides a 20-bit load such that a load from memory at address α maps each slot s to the memory word at address α+2s. Accordingly, 20-bit loads to slot s occur from a consecutive pair of address locations 01, 23, 45, etc. The vstw mem128, vs operation is shown in FIG. 15 similar to vldw vd, mem128 but for opposite data movement, i.e., from vector registers 128 rather than from memory 160.

Figure 16:
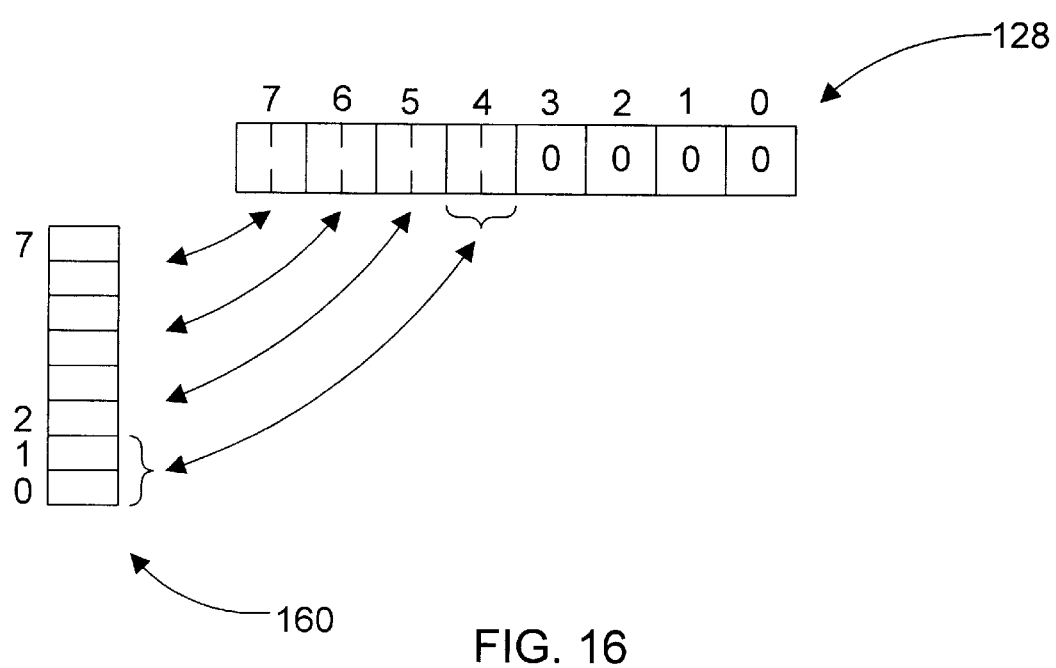

FIG. 16 illustrates instructions vldw vdh, mem64 and vstw mem64, vsh. Load vldw vdh, mem64 is carried forth from memory address α=0–7 to respective register slots 4–7, while slots 0–3 are set to 0. Similar to instruction vldw vd, mem128, instruction vldw vdh, mem64 loads the destination register 128 with signed 16-bit data. However, instead of loading 16 bytes of data at address mem128, vldw vdh, mem64 loads 8 byte of data at address mem64. FIG. 16 also illustrates a store operation, vstw mem64, vsh which causes storage of operands in slots 4–7 to 8 bytes of signed 16-bit data at address mem64.

Figure 17:
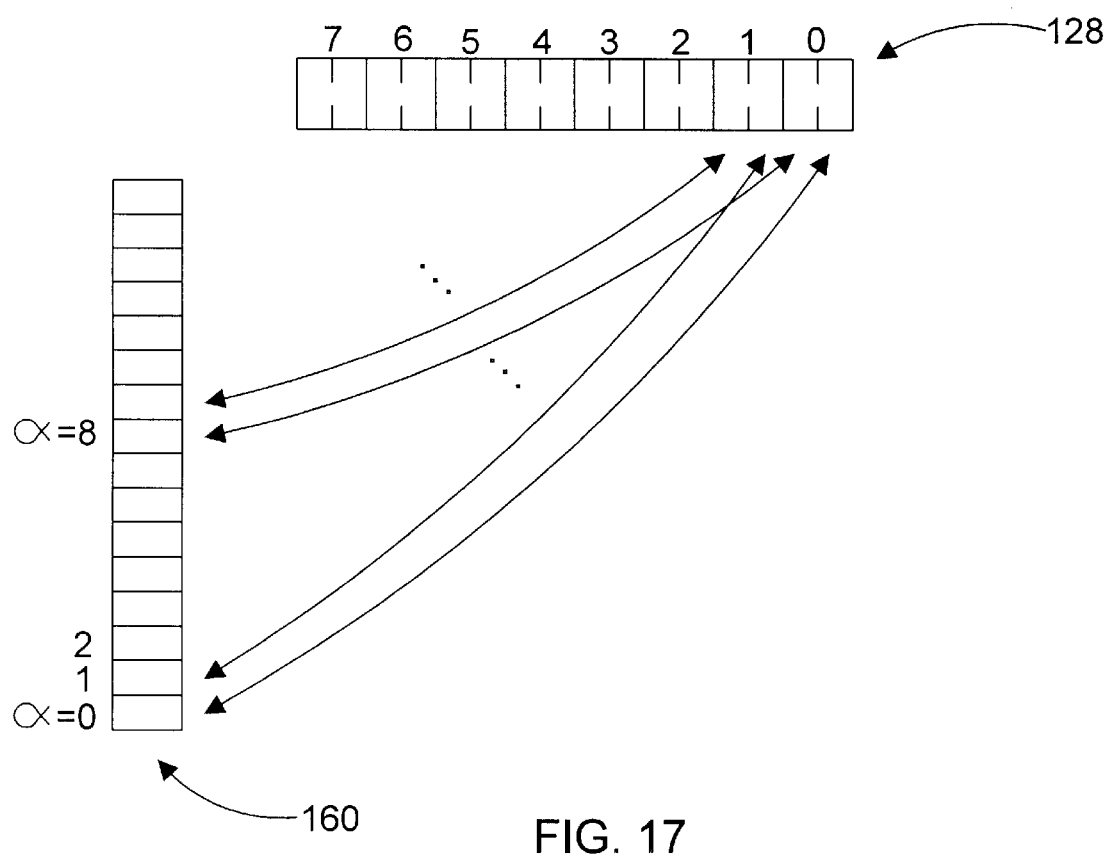

FIG. 17 illustrates the vldb vd, mem128 and vstb mem64, vsh load/store instructions wherein 16 byte load and store operations occur in a 2:1 byte interleave pattern. A 10-bit load from memory address α maps the lower half of each slot s (i.e., lower half sub-slot) to the memory byte at address α+s; and it maps the upper half of each slot (i.e., upper half sub-slot) to the memory byte at address α+s+8. As a result, the MEU performs independent but identical operations on two sets of data that reside in two adjacent 8 byte octets of memory.

Figure 18:
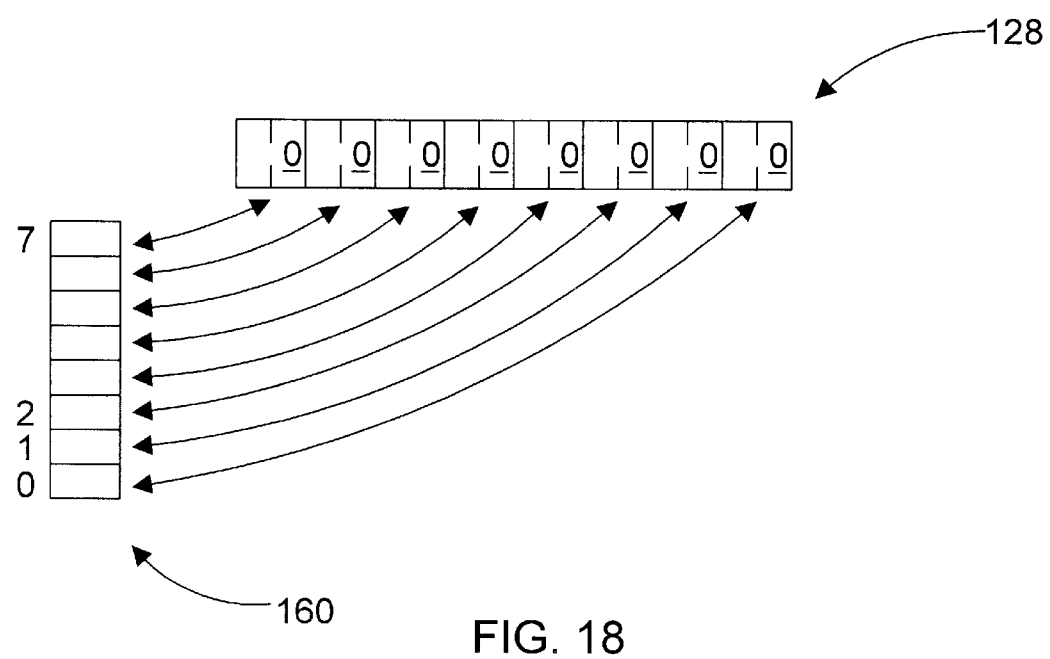

FIG. 18 illustrates in further detail vldb vdh, mem64 and vstb mem64, vsh load/store operations. A vldb vdh, mem64 instruction causes upper half sub-slots of each slot to receive memory values, and the lower half of sub-slot of each slot is set to 0. Conversely, a vstb mem64, vsh instruction stores the upper half of the sub-slot of each slot to a memory address, while the lower half sub-slot of each slot is ignored.

Load/store mappings shown in FIGS. 15 and 17 allow ORU 124 to operate the same way regardless of the partition size specified in the vector instruction. Thus, ORU 124 can be implemented in a single set of 8-to-1 multiplexers even though it handles two fundamentally different data types. FIG. 18 illustrates that an 8 byte load operation moves only half of the bits to the vector register. The entire 160-bit vector register, however, is updated by padding the bits within the unused sub-slots with 0s. This feature greatly simplifies the implementation of register renaming for the MEU because partial register updates do not occur.

The interleave mapping for 10-bit partitions is completely transparent to the programmer as long as only 10-bit loads/stores and vector instructions are performed on a given set of data. Interleaved mapping of 20-bit partitions is also transparent to the programmer if only 20-bit operations are performed. However, if 10-bit and 20-bit operations are mixed, then care must be taken to understand the mapping so that the expected results are produced. The interleaving can be very useful, for example, if a 10-bit load from an octet-sized memory location automatically expands and interleaves the byte-wide memory data to the upper portion of 20-bit partitions. The 20-bit operation can be immediately performed on this data without the need for explicit format conversions. Subsequently, 10-bit stores to octets can automatically perform the inverse 20-bit to 10-bit packing function. Thus, the present store operation, namely vstb mem64, vsh performs packing of n+4 bits within a slot of a vector register to n/2 bits within an address of the memory unit. Given n=16, 20-bit-to-8-bit packing can occur as part of the store operation. Additional operations, such as move or shift operations need not occur to perform a packing function. Packing serves to store the most significant bits from a slot. Unpacking is an operation by which n/2 bits from a memory address are loaded into n+4 bit locations within a slot. If n=16, then a load operation such as vldb vdh, mem64 causes 8-bits within a memory address to be loaded into a 20-bit slot. Utilizing load and store functions in such a manner thereby avoids having to implement separate unpack and pack instructions, respectively, within the MEU instruction set. Accordingly, the same result can be achieved but with fewer instructions. For MPEG, 8-bit pixels are unpacked to 20-bit numbers for DCT or IDCT manipulations, then the results are repacked to 8-bit pixels. The internals of the DCT and IDCT operations require more than 8 bits of precision, to which packing and unpacking are particularly advantageous.

FIGS. 15 and 16 illustrate 20-bit load and store operations, whereas FIGS. 17 and 18 illustrate 10-bit load and store operations. For 10-bit load/store mappings, there is purposely no interaction between data in the upper half sub-slots and data in the lower half sub-slots. The ORU routes data only in terms of slots and does not have the resolution to route sub-slots. Given the ability to interleave mapping, there can be no interaction between the data in the octet starting at address α and the data in the adjacent octet starting at address α+8, even though both data values can be loaded at the same time. Thus, for 10-bit operations, there is a barrier between memory octets that data does not cross. This barrier is mapped by the interleave loads and stores to the midpoint of each slot within each vector register.

For 20-bit operations, there is no barrier limitation since each monolithic 20-bit ALU partition (i.e., logic portions 117) covers both the upper and lower sub-slots of each slot. Whenever it is necessary to route 10-bit data across the barrier separating sub-slots, 20-bit slot routing operations blbh, ahbh, etc., are used. The following exemplary code demonstrates how 20-bit operations serve to route slots amongst each other, and sub-slots within certain slots:

```
;16 video bytes are in data in memory (the MSB, A, is shown on left):
;ABCD EFGH IJKL MNOP
;need to extract 8 unaligned bytes from center; FCHI JKLM
;load 16 bytes into register v0 (load does interleaving)
vldb v0, byte ptr [esi] ;esi points to byte "P"
;now v0 contains AIBJ CKDL EMFN GOHP
;in slots: 7766 5544 3322 1100
;use 20-bit routing ops to move data across 10-bit routing barrier
{mov mov mov blbh blbh blbh blbh blbh} word v0, v0, v0(21076543)
;now v0 contains FNGO HPIA JBKC LDME = FxGx HxIx JxKx LxMx
;store 8 bytes into memory
vstb byte ptr [edi], v0h
;*[edi] contains FGHI JKLM
```

Movement of data not only between slots, but between sub-slots is particularly helpful when performing MPEG motion compensation on 8-bit pixel values. In the example shown above, a single load instruction which causes inter-leaving of 16-bytes, followed by four move and four sub-slot routing instructions performs the same function but in a more efficient manner than doing unaligned memory references. Thus, MPEG motion compensation on a 1×8 block is advantageously performed by a single interleaving load operation, followed by a single vector instruction containing three move operations (mov) and five sub-slot swapping operations (blbh) across five slot midpoints.

All MEU instructions, whether those instructions are load/store instructions or vector operational instructions, are mapped into a single row in the 0Fh(hex) prefix section of the x86 opcode map. The MEU load and store instructions are used in normal modR/M-based instruction format, wherein 8 opcodes are used (one for each load and store variation). The reg field of the modR/M byte selects the vector register. The opcode may optionally be followed by a SIB byte and/or a displacement value. The following Table IV illustrates MEU instruction opcode map:

TABLE IV

| Instruction Opcode Map | |
|---|---|
| Instruction | Encoding |
| vldw vd, mem128 | 0Fh F0h modR/M [SIB] [disp] |
| vldw vdh, mem64 | 0Fh F1h modR/M [SIB] [disp] |
| vldb vd, mem128 | 0Fh F2h modR/M [SIB] [disp] |
| vldb vdh, mem64 | 0Fh F3h modR/M [SIB] [disp] |
| vstw mem128, vs | 0Fh F4h modR/M [SIB] [disp] |

TABLE IV-continued

| Instruction Opcode Map | |
|---|---|
| Instruction | Encoding |
| vstw mem64, vsh | 0Fh F5h modR/M [SIB] [disp] |
| vstb mem128, vs | 0Fh F6h modR/M [SIB] [disp] |
| vstb mem64, vsh | 0Fh F7h modR/M [SIB] [disp] |
| (All Vector Instructions) | 0Fh F8h nn nn nn nn nn nn nn nn |

All MEU register-to-register vector instructions outlined in Table I share a single additional x86 opcode. The vector instructions do not use a modR/M memory reference. Instead, 8 bytes are added to the vector instructions to hold the vector instruction information and bits for future expansion.

The addressing mode (modR/M) byte specifies the registers used by the instruction, as well as memory addressing modes. More particularly, the modR/M byte may specify a register value to be added to the displacement in order to form a memory address for the load/store instructions. Alternatively, the modR/M byte may specify that the SIB byte is included. The scale-index-base (SIB) byte is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value, thereby forming a memory address. The optional displacement field (disp) may be from one to four bytes in length. The displacement field contains a constant which is added to one or more register values to form the address for the load/store instructions.

Figure 19:
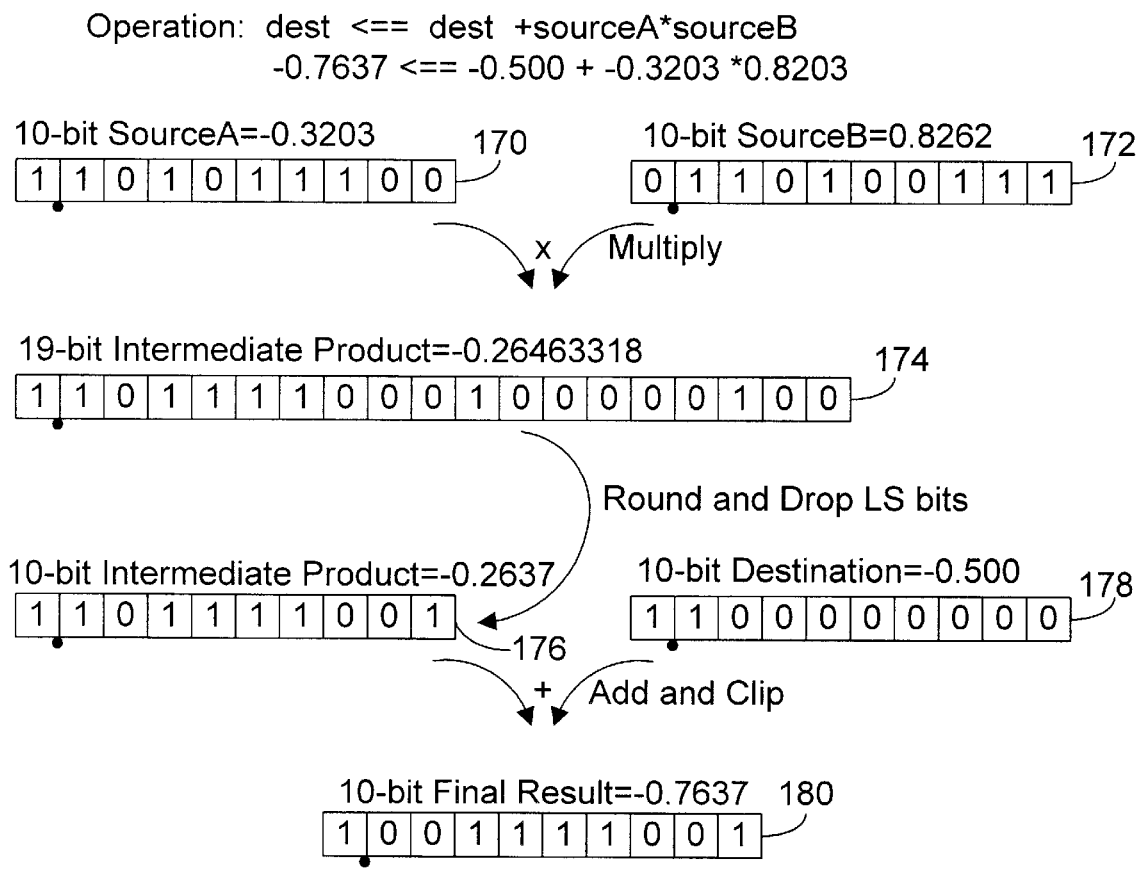
FIG. 19 illustrates saturating arithmetic performed upon fixed point, signed values according to the present invention.

FIG. 19 provides exemplary arithmetic operations performed on fixed point values according to several of the vector operational instructions shown in Table I. FIG. 19 illustrates fractional representations of fixed point numbers which range in some instances between −1.0 to +1.0. One advantage of using a fractional, fixed-point format over an integer format or a floating point format is that the magnitude of the data does not grow with each multiply operation. Namely, the product of two numbers within the +1.0 to −1.0 range, or between 0.0 and approximately 1.0 is another number within that range. Thus, even though the inputs and outputs of an algorithm may need to be scaled, it is less likely that the data will need to be re-scaled at each step.

In FIG. 19, a 10-bit source A operand is represented as 1.101011100 (binary), which corresponds to −0.3203 (decimal). The most significant bit to the right of the sign bit is represented as 0.5 decimal, the next most significant bit is 0.25 decimal, the next most significant bit is 0.125, and so on. Since the 10-bit source A operand is a negative value, two's complement arithmetic is used whereby the decimal values is added to a −1.0 (decimal) value to render the −0.3203 value.

An important benefit of having extended precision gained by adding 25 percent more bits to the value as it is loaded into registers is the capability of creating a unified representation for signed and unsigned memory data. This representation retains all the information present from either format and eliminates the need to have different ALU opcodes for signed and unsigned data. Load operations 148 and 152 in FIG. 14 illustrate the added precision and the capability of representing either signed or unsigned data in a single, unified format. Thus, regardless of whether the data in memory is signed or unsigned, data within the registers takes on a single signed format from which the vector ALU can operate from a single unified instruction regardless of whether the stored value was signed or unsigned.

The following Table V illustrates the extended precision offered by loading an 8-bit byte into a 10-bit sub-slot, or loading a 16-bit word into a 20-bit slot:

TABLE V

MEU Data Format Value Ranges

| Data Type | Bit Width | Binary Point Posn. | Minimum Representable Value | Maximum Representable Value |
|---|---|---|---|---|
| Unsigned Mem Byte | 8 | 0.8 | 0.0 | 0.9961 $(1-2^{-8})$ |
| Signed Mem Byte | 8 | 1.7 | −1.0 | 0.9922 $(1-2^{-7})$ |
| Byte Register Partition | 10 | 1.9 | −1.0 | 0.9980 $(1-2^{-9})$ |
| Unsigned Mem Word | 16 | 0.16 | 0.0 | 0.9999847 $(1-2^{-16})$ |
| Signed Mem Word | 16 | 1.15 | −1.0 | 0.9999695 $(1-2^{-15})$ |
| Word Register Partition | 20 | 1.19 | −1.0 | 0.9999981 $(1-2^{-19})$ |

Table V illustrates maximum and minimum values of data within memory or within the vector registers, depending upon whether the memory data is signed or unsigned. ALU 116 performs all arithmetic operations using saturating arithmetic. Converse to modulo arithmetic, saturating arithmetic forces a value to be "clipped" if it is too large to fit in the destination. Modulo arithmetic merely wraps the large value back around leaving a remainder value. The clipping mechanism of saturating arithmetic is one whereby a maximum representative positive value is substituted for the oversized positive value. A similar substitution is done when the result is too negative. If the data is signed data, and the signed bit is set such that a negative value is represented, then if the negative value becomes too large to fit in the destination bit locations, a maximum representable negative value is substituted for the oversized negative value. Table V illustrates the maximum and minimum positive and negative values which would be substituted if an overflow occurs. Saturating arithmetic is more suitable than modular arithmetic for performing operations upon image data or audio data.

Vector add, subtract and Boolean instructions are performed on 10-bit or 20-bit quantities. If the result of an add or subtract operation goes outside the range offered by a 10-bit or 20-bit partition, then the result is clipped to the largest positive or negative representable value. Boolean operations, however, are not clipped. The result of add, subtract and move vector instructions may optionally be shifted right by one bit before storing to the destination. The right-shift, or scaling operation, can be used to compensate for the tendency of the data magnitude to grow with each add and subtract operation. The add and subtract operations generate at most one bit of overflow; the scaled versions of add and subtract cause a shift of this overflow bit into the high bit of the result so that clipping can be avoided. Multiply instructions take two 10-bit or 20-bit signed operands, and generate a 19-bit or 39-bit signed product. The least significant 9 or 19 bits of the product are rounded and dropped before storing into the 10-bit or 20-bit destination register. An example of a multiply operation performed on two 10-bit signed operands is shown in FIG. 19. The resulting 19-bit intermediate product is rounded, and the least significant bits dropped to produce a 10-bit intermediate product. The 10-bit operands which are multiplied together are shown by reference numerals 170 and 172. The 19-bit intermediate product is shown as reference numeral 174, and the intermediate product after the least significant bits are rounded and dropped is shown as reference numeral 176.

Simple multiply operations do not require clipping since an overflow condition generally cannot occur. However, a multiply-and-accumulate (mac) vector instruction does require clipping of the operand product. The mac instruction is carried forth by adding the operand of the previous product to the current operand product and storing that summation as a final result. The previous product occupies a 10-bit location within a destination register, as shown by reference numeral 178. When the previous product 178 is added to the current product 176, a final result 180 is produced. Result 180 therefore represents a running sum of the multiply products. The running sum is shown as a clipped value, since summation of operands 176 and 178 causes a negative value too large to fit within the 10-bit sub-slot.

Rounding issues arise whenever an operation produces low-order bits that do not map into the destination format. Rounding occurs in the following vector instructions: round (rnd n), multiply (mul and mac), right-scaled additive operations (add_, sub_, sbr_, and acum_), right-shift operations (asr n, lsr n), and store operations (vstb and vstw). When a round (rnd n) operation occurs, data is not shifted; instead, the low-order bits are set to 0. A "round to even" method is used when the rounded bits are exactly equal to one half of the designated least significant bit (bit n). In this case, the rounding direction is picked so that the result (from bit n up) is even. This convergent rounding eliminates any statistical bias on the direction of the rounding. In a multiply operation (mul and mac), the 20-bit partition versions of these operations drop the lowest 19 bits of the 39-bit intermediate product. In a 10-bit partition version, 9 bits of the 19-bit intermediate product are dropped. These operations implement simple rounding by adding a value of ½ of the destination operand least significant bit to the intermediate product before truncating it. To keep the multiplier data path as short as possible, rounding is not convergent. If the bits to be dropped are exactly equal to ½ of the destination operand least significant bit, then the result is unconditionally rounded up. In right-scaled additive operations, right-shift operations and store operations, no rounding is performed. Instead, the lowest bit(s) are truncated. Generally speaking, regardless of the operation, if a rounded result is important for the operation that performs a truncation, then an explicit rnd n can be applied to the data prior to the operation.

While fixed point arithmetic is used, there may be instances where block floating point operations would be of benefit. The magnitude check (mag) vector instruction is used to implement block floating point operations. If results from fixed point math become too small or large to fit in a destination register and clipping is not desired, then scaling the data to a block floating point value can occur. The mag instruction automatically checks for runs of up to seven 1s or 0s. The mag instruction therefore checks all data following a computation, and scale instructions (asl or asr) scale all data according to the shortest run of 1s or 0s. If the shortest run is seven or more bits, this still leaves sufficient dynamic range. Consequently, the mag instruction does not check beyond seven bits. This limitation significantly reduces the gate count (i.e., silicon area) necessary to implement this instruction.

A distance instruction dist is also provided with the vector operational instructions listed in Table I. The dist instruction is useful for MPEG motion estimation. Motion estimation requires finding the difference between pixels in different frames. Pixel comparisons are done on a 16×16 pixel basis, called macroblocks. This operation requires finding the difference between two pixel values (the error) and summing the errors.

There are no limitations on using the vector instructions of Tables I and II concurrent with integer instructions. Further, there are no limitations on mixing the vector instructions with floating point instructions (i.e., x87-type instructions). However, frequent switching between vector instructions and floating point instructions may cause the microprocessor to stall execution while it performs operations to maintain coherency between the MEU and floating point units. Thus, while a portion of the floating point registers may be dedicated to vector registers useable with an MEU, coherency between those registers and non-MEU floating point registers may be needed. The vector registers are designated and correspond to the physical floating point unit registers. Thus, the floating point unit physical register 0 is the same as the lower half of MEU vector register V0, and the floating point unit physical register 1 is the same as the upper half of MEU vector register V0. This mapping of vector registers to floating point unit registers continues such that the floating point unit physical register 7 is the same as the upper half of MEU vector register V3.

An x86 processor has two bits in the CR0 register to help manage task switching and emulation for floating point code. The two bits are designated the TS bit and the EM bit. The TS bit is set whenever a task switch occurs. While the TS bit is set, interrupt seven is called when any floating point unit instruction is encountered. The operating system handler for interrupt seven saves the floating point unit state and resets the TS bit. This scheme allows the operating system to save the floating point unit state only for tasks that actually use the floating point unit. The MEU uses the TS bit in the same way as the floating point unit. Any MEU instruction that is encountered while the TS bit is set also causes assertion of interrupt seven. The EM bit is intended to help implement software emulation of the floating point unit. When the EM bit is set under software control, any floating point unit instruction causes an interrupt seven. However, execution of MEU instructions do not cause an interrupt seven to occur since, if the MEU exists, there is no need to emulate its instructions.

Conventional floating point units comprise three registers for status and control: the floating point unit status word, control word and tag word. These registers contain bits for exception flags, exception mask, condition codes, precision codes, rounding control and stack tags. The MEU does not use or modify any of the above bits except for the stack tag bits. The MEU modifies the stack tag bits because MEU result values are often not valid floating-point numbers. Any time an MEU vector instruction is executed, the entire floating point unit tag word is set to 0FFFFh, marking all floating point unit registers as empty. In addition, the top-of-stack pointer in the floating point unit status word (bits 11–13) is set to 0, indicating an empty stack. Thus, any vector instruction effectively destroys any floating-point values that may have been in the floating point unit. This is not of concern since task switches between the OS (operating system) saves and restores the complete floating-point unit stack for each task. Use of both MEU instructions and floating point unit instructions within the same task is generally undesirable, and may require saving of the state of the floating point unit/MEU registers between the execution of any two instructions of differing types.

Merely to help understand the various vector instructions and a practical purpose of such instructions, code which implements the IDCT flowgraph of FIG. 4 is as follows:

```
vlds v01, [esi]
vlds v0h, [esi + 8]
{mul mul mul mul mul mul mul mul} word v0, v2, v0(37156240)
{add subr add sub add sub subr add} word v0, v0, v0(45672301)
{mul mul mul mul mul mul mul mul} word v1, v3, v1(56547264)
{acum add add add acum add acum acum} word v0, v1, v1 (70312ZZZ)
{add, add, sub, subr, subr, subr, add, add} word v0, v0, v0 (654Z0123)
{subr, subr, subr, subr, add, add, add, add} word v0, v0, v0 (01234567)
vsts [esi], v01
vsts [esi + 8], v0h
```

The esi register points to the data, and vector registers v2 and v3 are pre-loaded with the constant coefficients of the IDCT algorithm. The above code illustrates many of the vector instructions (operational vector instructions and load/store vector instructions) as they pertain to MPEG, and more specifically the IDCT algorithm in MPEG decoders.

As another example, code can be written to implement a stretch BitBlt algorithm. The ORU 124 proves particularly beneficial in the BitBlt algorithm, as evidenced by the following code:

```
vldw v0, [esi]                        ; get source pixels (16bpp)
{mov mov mov mov mov mov mov mov} word v1, v0, v0(77665544)
vstw [ebp], v1                        ; store stretched pixels
vstw [ebp+scanline], v1               ; store stretched pixels
{mov mov mov mov mov mov mov mov} word v1, v0, v0(33221100)
vstw [ebp+16], v1                     ; store stretched pixels
vstw [ebp+16+scanline], v1            ; store stretched pixels
```

The esi registers point to the source, and the ebp registers point to the destination. In the BitBlt example, the source pixels are copied to 4× of the original size, wherein pixels are assumed to be 16 bits per pixel.

As another illustrative example, code can be written to perform the inner loop of MPEG motion estimation as follows:

```
vldb v0, [esi]
vldb v1, [edi]
dist dist dist dist dist dist dist dist} byte v1, v1, v0 (76543210)
{acum acum acum acum acum acum acum acum} byte v2, v1,
v1 (76543210)
```

The esi register points to the reference pixels (or pixels within the I frames) and the edi registers point to the search pixels. Vector registers v0 and v1 point to pixels to be compared, and vector register v2 contains the sum of the errors. After the errors have been summed, the partitions need to be summed together, as shown by the following code:

```
{add__add__add__add__add__add__add__add__} byte v2,
v2, v2 (Z7Z5Z3Z1)
{add__add__add__add__add__add__add__add__} byte v2,
v2, v2 (ZZZ6ZZZ2)
{add__add__add__add__add__add__add__add__} byte v2,
v2, v2 (Z7ZZZZZ4)
{acum acum acum acum acum acum blbh acum} word v2,
v2, v2 (ZZZZZZ0Z)
{add__add__add__add__add__add__add__add__} byte v2,
v2, v2 (ZZZZZZZ1)
```

The blbh instructions are used to swap the partitions to generate the final add.

It will be appreciated to those skilled in the art having the benefit of this disclosure that this invention is believed to be capable of performing various multimedia-type algorithms. Operations within the algorithms are performed in stages, wherein multiple operations in each stage are carried out in concurrent fashion and with minimal impact upon the core blocks of a conventional x86 microprocessor. Thus, it is to be understood that the form of the invention shown and described is to be taken as presently preferred embodiments of an MEU having partitioned registers, possibly derived from a floating point unit, partitioned ALU and an ORU interposed therebetween. Various modifications and changes may be made to the processor core, as well as to each and every component of the MEU, as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A system for moving an operand from a source register to a destination register, comprising:
   a first source register partitioned into a plurality of first slots and a second source register partitioned into a plurality of second slots, wherein each one of said first and second slots is configured for storing a different operand, and wherein said first and second source registers are each configured for providing multiple different operands in parallel;
   a plurality of logic units each configured to perform an instruction on an operand from a respective one of said first slots and an operand from a respective one of said second slots, wherein said plurality of logic units are configured to perform concurrently;
   a destination register partitioned into a plurality of destination slots;
   a data bus operably coupled for loading a first operand into a slot of said plurality of first slots and for loading a second operand into a slot of said plurality of second slots, respectively; and
   a control bus operably coupled to provide a conditional move instruction to one of said logic units for moving said second operand into a slot of said plurality of destination slots depending upon a value of said first operand.

2. The system as recited in claim 1, wherein said data bus is configured such that said first operand is loaded into slot n of said plurality of said first slots and said second operand is loaded into slot n of said plurality of second slots.

3. The system as recited in claim 2, wherein said second operand within slot n of said plurality of second slots is moved into slot n of said plurality of destination slots depending upon the value of said first operand.

4. The system as recited in claim 1, wherein said instruction causes moving of said second operand into said destination register if the value of said first operand is equal to zero.

5. The system as recited in claim 1, wherein said instruction causes moving of said second operand into said destination register if the value of said first operand is not equal to zero.

6. The system as recited in claim 1, wherein said instruction causes moving of said second operand into said destination register if the value of said first operand is greater than zero.

7. The system as recited in claim 1, wherein said instruction causes moving of said second operand into said destination register if the value of said first operand is less than zero.

8. The system as recited in claim 1, wherein one of said logic units has a portion which receives said value and produces a signal conditioned upon said instruction and said value.

9. The system as recited in claim 1, wherein said value is a fractional value greater than zero, less than zero, or equal to zero.

10. The system as recited in claim 1, wherein said first and second source registers are vector registers, and wherein said logic units are configured for performing vector operations.

11. The system as recited in claim 1, wherein said second operand is a component of a vector.

12. The system as recited in claim 1, wherein said second operand represents a pixel within an image, and wherein said conditional move instruction is used in moving said pixel from one location to another location within the image depending upon the condition of another pixel within the image.

* * * * *